United States Patent
Mosebrook et al.

(10) Patent No.: US 7,687,940 B2
(45) Date of Patent: Mar. 30, 2010

(54) DIMMER SWITCH FOR USE WITH LIGHTING CIRCUITS HAVING THREE-WAY SWITCHES

(75) Inventors: Donald Mosebrook, Coopersburg, PA (US); Christopher M. Rogan, State College, PA (US); Jamie J. Steffie, Slatington, PA (US); Jon M. Keagy, Perkasie, PA (US); Steven E. Detmer, Hellertown, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 269 days.

(21) Appl. No.: 11/447,496

(22) Filed: Jun. 6, 2006

(65) Prior Publication Data

US 2007/0007826 A1  Jan. 11, 2007

Related U.S. Application Data

(60) Provisional application No. 60/687,690, filed on Jun. 6, 2005.

(51) Int. Cl.
*H01H 35/00* (2006.01)
*H05B 37/02* (2006.01)

(52) U.S. Cl. .................. 307/131; 307/115; 307/125; 315/246

(58) Field of Classification Search .............. 307/131
See application file for complete search history.

(56) References Cited

U.S. PATENT DOCUMENTS 4,242,630 A * 12/1980 Szpakowski et al. ........ 323/248

(Continued)

FOREIGN PATENT DOCUMENTS

FR  2 743 465  7/1997

(Continued)

OTHER PUBLICATIONS

Leviton Manufacturing Co., Inc., Acenti Product Specifications, 2004, 12 pages.

(Continued)

*Primary Examiner*—Albert W Paladini
*Assistant Examiner*—Hal I Kaplan
(74) *Attorney, Agent, or Firm*—Ostrolenk Faber LLP

(57) ABSTRACT

A smart dimmer switch for control of a lighting load from an AC voltage source can replace any switch in a three-way or four-way lighting control system. The smart dimmer switch can be connected on the line-side or the load-side of a three-way system with a standard three-way switch in the other location. Further, the dimmer switch can replace a four-way switch in a four-way system and is operable to be coupled to two standard three-way switches. The dimmer switch includes either one or two semiconductor switches to control the intensity of the connected lighting load. The dimmer switch preferably includes a sensing circuit for detecting an electrical characteristic (i.e., either a voltage or a current) at a terminal of the dimmer to determine the state of the connected three-way switch(es) or four-way switch. The dimmer switch preferably controls the state of the semiconductor switch in response to either a toggle of any of the other switches in the system or an actuation of a toggle button of the dimmer switch.

77 Claims, 20 Drawing Sheets

U.S. PATENT DOCUMENTS

| | | | |
|---|---|---|---|
| 4,334,171 A | 6/1982 | Parman et al. | |
| 4,439,688 A | 3/1984 | Schornack | |
| 4,563,592 A | 1/1986 | Yuhasz et al. | |
| 4,689,547 A | 8/1987 | Rowen et al. | |
| 4,745,351 A | 5/1988 | Rowen et al. | |
| 4,772,824 A | 9/1988 | Gulledge | |
| 4,841,221 A | 6/1989 | Barney et al. | |
| 5,248,919 A | 9/1993 | Hanna et al. | |
| 5,264,761 A | 11/1993 | Johnson | |
| 5,798,581 A | 8/1998 | Keagy et al. | |
| 5,982,051 A | 11/1999 | Cousy | |
| 6,313,588 B1 | 11/2001 | Mosebrook et al. | |
| 6,346,781 B1 | 2/2002 | Mosebrook et al. | |
| 6,700,333 B1 | 3/2004 | Hirshi et al. | |
| 6,980,122 B2 | 12/2005 | Novikov | |
| 6,987,449 B2 | 1/2006 | Novikov | |
| 7,012,518 B2 | 3/2006 | Novikov | |
| 7,186,003 B2 * | 3/2007 | Dowling et al. | 362/234 |

FOREIGN PATENT DOCUMENTS

| | | |
|---|---|---|
| GB | 2 343 796 | 5/2000 |
| WO | WO 2006/133168 | 12/2006 |

OTHER PUBLICATIONS

Leviton/Acenti Reverse Engineered Schematics, not dated, 1 page.

* cited by examiner

A = Toggle Three-Way Switch 504 to Position A
B = Toggle Three-Way Switch 504 to Position B
T = Actuation of Toggle Button of User Interface 528

A = Toggle Three-Way Switch 804 to Position A
B = Toggle Three-Way Switch 804 to Position B
C = Toggle Three-Way Switch 803 to Position C
D = Toggle Three-Way Switch 803 to Position D
T = Actuation of Toggle Button of User Interface 720

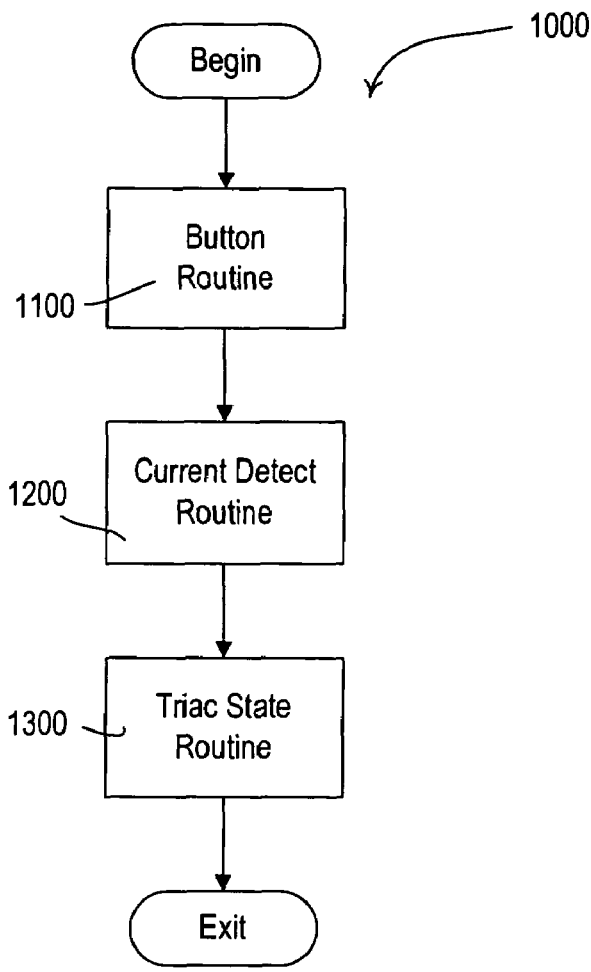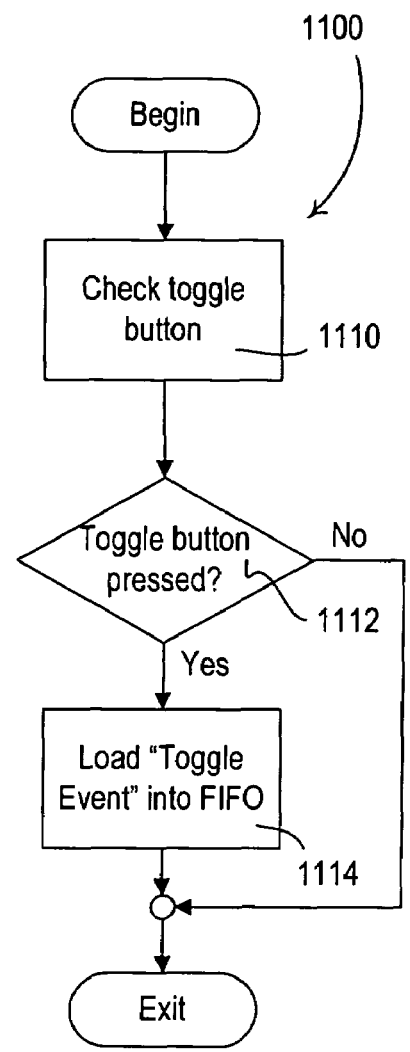
FIG. 10
FIG. 11

DIMMER SWITCH FOR USE WITH LIGHTING CIRCUITS HAVING THREE-WAY SWITCHES

RELATED APPLICATIONS

This application claims priority from commonly-assigned U.S. Provisional Application Ser. No. 60/687,690, filed Jun. 6, 2005, entitled INTELLIGENT THREE-WAY AND FOUR-WAY DIMMERS, the entire disclosure of which is hereby incorporated by reference.

BACKGROUND OF THE INVENTION

1. Field of the Invention

The present invention relates to dimmer switches for electrical wiring systems having three-way switches. In particular, the present invention relates to a dimmer switch that can be substituted for a four-way switch, a line-side three-way switch, or a load-side three-way switch in lighting circuits having either two or more points of control, such as, for example, a four-way system.

2. Description of the Related Art

Three-way and four-way switch systems for use in controlling loads in buildings, such as lighting loads, are known in the art. Typically, the switches used in these systems are wired to the building's alternating-current (AC) wiring system, are subjected to AC source voltage, and carry full load current, as opposed to low-voltage switch systems that operate at low voltage and low current, and communicate digital commands (usually low-voltage logic levels) to a remote controller that controls the level of AC power delivered to the load in response to the commands. Thus, as used herein, the terms "three-way switch", "three-way system", "four-way switch", and "four-way system" mean such switches and systems that are subjected to the AC source voltage and carry the full load current.

A three-way switch derives its name from the fact that it has three terminals and is more commonly known as a single-pole double-throw (SPDT) switch, but will be referred to herein as a "three-way switch". Note that in some countries a three-way switch as described above is known as a "two-way switch".

A four-way switch is a double-pole double-throw (DPDT) switch that is wired internally for polarity-reversal applications. A four-way switch is commonly called an intermediate switch, but will be referred to herein as a "four-way switch".

In a typical, prior art three-way switch system, two three-way switches control a single load, and each switch is fully operable to independently control the load, irrespective of the status of the other switch. In such a system, one three-way switch must be wired at the AC source side of the system (sometimes called "line side"), and the other three-way switch must be wired at the load side of the system.

FIG. 1A shows a standard three-way switch system 100, which includes two three-way switches 102, 104. The switches 102, 104 are connected between an AC voltage source 106 and a lighting load 108. The three-way switches 102, 104 each include "movable" (or common) contacts, which are electrically connected to the AC voltage source 106 and the lighting load 108, respectively. The three-way switches 102, 104 also each include two fixed contacts. When the movable contacts are making contact with the upper fixed contacts, the three-way switches 102, 104 are in position A in FIG. 1A. When the movable contacts are making contact with the lower fixed contact, the three-way switches 102, 104 are in position B. When the three-way switches 102, 104 are both in position A (or both in position B), the circuit of system 100 is complete and the lighting load 108 is energized. When switch 102 is in position A and switch 104 is in position B (or vice versa), the circuit is not complete and the lighting load 108 is not energized.

Three-way dimmer switches that replace three-way switches are known in the art. An example of a three-way dimmer switch system 150, including one prior art three-way dimmer switch 152 and one three-way switch 104 is shown in FIG. 1B. The three-way dimmer switch 152 includes a dimmer circuit 152A and a three-way switch 152B. A typical, AC phase-control dimmer circuit 152A regulates the amount of energy supplied to the lighting load 108 by conducting for some portion of each half-cycle of the AC waveform, and not conducting for the remainder of the half-cycle. Because the dimmer circuit 152A is in series with the lighting load 108, the longer the dimmer circuit conducts, the more energy will be delivered to the lighting load 108. Where the lighting load 108 is a lamp, the more energy that is delivered to the lighting load 108, the greater the light intensity level of the lamp. In a typical dimming operation, a user may adjust a control to set the light intensity level of the lamp to a desired light intensity level. The portion of each half-cycle for which the dimmer conducts is based on the selected light intensity level. The user is able to dim and toggle the lighting load 108 from the three-way dimmer switch 152 and is only able to toggle the lighting load from the three-way switch 104. Since two dimmer circuits cannot be wired in series, the three-way dimmer switch system 150 can only include one three-way dimmer switch 152, which can be located on either the line side or the load side of the system.

A four-way switch system is required when there are more than two switch locations from which to control the load. For example, a four-way system requires two three-way switches and one four-way switch, wired in well known fashion, so as to render each switch fully operable to independently control the load irrespective of the status of any other switches in the system. In the four-way system, the four-way switch is required to be wired between the two three-way switches in order for all switches to operate independently, i.e., one three-way switch must be wired at the AC source side of the system, the other three-way switch must be wired at the load side of the system, and the four-way switch must be electrically situated between the two three-way switches.

FIG. 1C shows a prior art four-way switching system 180. The system 180 includes two three-way switches 102, 104 and a four-way switch 185. The four-way switch 185 has two states. In the first state, node A1 is connected to node A2 and node B1 is connected to node B2. When the four-way switch 185 is toggled, the switch changes to the second state in which the paths are now crossed (i.e., node A1 is connected to node B2 and node B1 is connected to node A2). Note that a four-way switch can function as a three-way switch if one terminal is simply not connected.

FIG. 1D shows another prior art switching system 190 containing a plurality of four-way switches 185. As shown, any number of four-way switches can be included between the three-way switches 102, 104 to enable multiple location control of the lighting load 108.

Multiple location dimming systems employing a smart dimmer switch and a specially designed remote (or "accessory") switch that permit the dimming level to be adjusted from multiple locations have been developed. A smart dimmer is one that includes a microcontroller or other processing means for providing an advanced set of control features and feedback options to the end user. For example, the advanced features of a smart dimmer may include a protected or locked lighting preset, fading, and double-tap to full intensity. To power the microcontroller, smart dimmers include power supplies, which draw a small amount of current through the lighting load each half-cycle when the semiconductor switch is non-conducting. The power supply typically uses this small amount of current to charge a storage capacitor and develop a direct-current (DC) voltage to power the microcontroller. An example of a multiple location lighting control system, including a wall-mountable smart dimmer switch and wall-mountable remote switches for wiring at all locations of a multiple location dimming system, is disclosed in commonly assigned U.S. Pat. No. 5,248,919, issued on Sep. 28, 1993, entitled LIGHTING CONTROL DEVICE, which is herein incorporated by reference in its entirety.

Referring again to the system 150 of FIG. 1B, since no load current flows through the dimmer circuit 152A of the three-way dimmer switch 152 when the circuit between the supply 106 and the lighting load 108 is broken by either three-way switch 152B or 104, the dimmer switch 152 is not able to include a power supply and a microcontroller. Thus, the dimmer switch 152 is not able to provide the advanced set of features of a smart dimmer to the end user.

FIG. 2 shows an example multiple location lighting control system 200 including one wall-mountable smart dimmer switch 202 and one wall-mountable remote switch 204. The dimmer switch 202 has a Hot (H) terminal for receipt of an AC source voltage provided by an AC power supply 206, and a Dimmed Hot (DH) terminal for providing a dimmed-hot (or phase-controlled) voltage to a lighting load 208. The remote switch 204 is connected in series with the DH terminal of the dimmer switch 202 and the lighting load 208, and passes the dimmed-hot voltage through to the lighting load 208.

The dimmer switch 202 and the remote switch 204 both have actuators to allow for raising, lowering, and toggling on/off the light intensity level of the lighting load 208. The dimmer switch 202 is responsive to actuation of any of these actuators to alter the dimming level (or power the lighting load 208 on/off) accordingly. In particular, actuation of an actuator at the remote switch 204 causes an AC control signal, or partially rectified AC control signal, to be communicated from that remote switch 204 to the dimmer switch 202 over the wiring between the Accessory Dimmer (AD) terminal of the remote switch 204 and the AD terminal of the dimmer switch 202. The dimmer switch 202 is responsive to receipt of the control signal to alter the dimming level or toggle the load 208 on/off. Thus, the load can be fully controlled from the remote switch 204.

The user interface of the dimmer switch 202 of the multiple location lighting control system 200 is shown in FIG. 3. As shown, the dimmer switch 202 may include a faceplate 310, a bezel 312, an intensity selection actuator 314 for selecting a desired level of light intensity of a lighting load 208 controlled by the dimmer switch 202, and a control switch actuator 316. The faceplate 310 need not be limited to any specific form, and is preferably of a type adapted to be mounted to a conventional wall-box commonly used in the installation of lighting control devices. Likewise, the bezel 312 and the actuators 314, 316 are not limited to any specific form, and may be of any suitable design that permits manual actuation by a user.

An actuation of the upper portion 314A of the actuator 314 increases or raises the light intensity of the lighting load 208, while an actuation of the lower portion 314B of the actuator 314 decreases or lowers the light intensity. The actuator 314 may control a rocker switch, two separate push switches, or the like. The actuator 316 may control a push switch, though the actuator 316 may be a touch-sensitive membrane. The actuators 314, 316 may be linked to the corresponding switches in any convenient manner. The switches controlled by actuators 314, 316 may be directly wired into the control circuitry to be described below, or may be linked by an extended wired link, infrared (IR) link, radio frequency (RF) link, power line carrier (PLC) link, or otherwise to the control circuitry.

The dimmer switch 202 may also include an intensity level indicator in the form of a plurality of light sources 318, such as light-emitting diodes (LEDs). Light sources 318 may be arranged in an array (such as a linear array as shown) representative of a range of light intensity levels of the lighting load 208 being controlled. The intensity levels of the lighting load 208 may range from a minimum intensity level, which is preferably the lowest visible intensity, but which may be "full off", or zero, to a maximum intensity level, which is typically "full on", or substantially 100%. Light intensity level is typically expressed as a percent of full intensity. Thus, when the lighting load 208 is on, light intensity level may range from 1% to substantially 100%.

A simplified block diagram of the dimmer switch 202 and the remote switch 204 of the multiple location lighting control system 200 is shown in FIG. 4. The dimmer switch 202 employs a semiconductor switch 420 coupled between the hot terminal H and the dimmed hot terminal DH, to control the current through, and thus the light intensity of, the lighting load 208. The semiconductor switch 420 may be implemented as a triac or two field effect transistors (FETs) in anti-series connection. The semiconductor switch 420 has a control input (or gate), which is connected to a gate drive circuit 424. The input to the gate will render the semiconductor switch 420 conductive or non-conductive, which in turn controls the power supplied to the lighting load 208. The gate drive circuit 424 provides control inputs to the semiconductor switch 420 in response to command signals from a microcontroller 426.

The microcontroller 426 generates command signals to a visual display, e.g., a plurality of LEDs 418, for feedback to the user of the dimmer switch 202. The microcontroller 426 receives inputs from a zero-crossing detector 430 and a signal detector 432. A power supply 428 generates a DC output voltage $V_{CC}$ to power the microcontroller 426. The power supply is coupled between the hot terminal H and the dimmed hot terminal DH.

The zero-crossing detector 430 determines the zero-crossings of the input AC waveform from the AC power supply 206. A zero-crossing is defined as the time at which the AC supply voltage transitions from positive to negative polarity, or from negative to positive polarity, at the beginning of each half-cycle. The zero-crossing information is provided as an input to microcontroller 426. The microcontroller 426 provides the gate control signals to operate the semiconductor switch 420 to provide voltage from the AC power supply 206 to the lighting load 208 at predetermined times relative to the zero-crossing points of the AC waveform.

Generally, two techniques are used for controlling the power supplied to the lighting load 208: forward phase control dimming and reverse phase control dimming. In forward phase control dimming, the semiconductor switch 420 is turned on at some point within each AC line voltage half-cycle and remains on until the next voltage zero-crossing. Forward phase control dimming is often used to control energy to a resistive or inductive load, which may include, for example, a magnetic low-voltage transformer or an incandescent lamp. In reverse phase control dimming, the semiconductor switch 420 is turned on at the zero-crossing of the AC line voltage and turned off at some point within each half-cycle of the AC line voltage. Reverse phase control is often used to control energy to a capacitive load, which may include, for example, an electronic low-voltage transformer. Since the semiconductor switch 420 must be conductive at the beginning of the half-cycle, and be able to be turned off within the half-cycle, reverse phase control dimming requires that the dimmer have two FETs in anti-serial connection, or the like.

The signal detector 432 has an input 440 for receiving switch closure signals from momentary switches T, R, and L. Switch T corresponds to a toggle switch controlled by the switch actuator 316, and switches R and L correspond to the raise and lower switches controlled by the upper portion 314A and the lower portion 314B, respectively, of the intensity selection actuator 314.

Closure of switch T will connect the input of the signal detector 432 to the DH terminal of the dimmer switch 202, and will allow both positive and negative half-cycles of the AC current to flow through the signal detector. Closure of switches R and L will also connect the input of the signal detector 432 to the DH terminal. However, when switch R is closed, current can only flow through the signal detector 432 during the positive half-cycle of the AC power supply 406 because of a diode 434. In similar manner, when switch L is closed, current can only flow through the signal detector 432 during the negative half-cycles because of a diode 436. The signal detector 432 detects when the switches T, R, and L are closed, and provides two separate output signals representative of the state of the switches as inputs to the microcontroller 426. A signal on the first output of the signal detector 432 indicates a closure of switch R and a signal on the second output indicates a closure of switch L. Simultaneous signals on both outputs represents a closure of switch T. The microprocessor controller 426 determines the duration of closure in response to inputs from the signal detector 432.

The remote switch 204 provides a means for controlling the dimmer switch 202 from a remote location in a separate wall box. The remote switch 204 includes a further set of momentary switches T', R', and L' and diodes 434' and 436'. A wire connection is made between the AD terminal of the remote switch 204 and the AD terminal of the dimmer switch 202 to allow for the communication of actuator presses at the remote switch. The AD terminal is connected to the input 440 of the signal detector 432. The action of switches T', R', and L' in the remote switch 204 corresponds to the action of switches T, R, and L in the dimmer switch 202.

The system shown in FIGS. 2, 3, and 4 provides a fully functional three-way switching system wherein the user is able to access all functions, such as, for example, dimming at both locations. However, in order to provide this functionality, both switching devices need to be replaced with the respective devices 202, 204.

Sometimes it is desired to place only one smart switch in the three-way or four-way switching circuit. As shown in FIG. 1B, it is not possible heretofore to do this by simply replacing the dimmer 152 with a smart dimmer, leaving mechanical three-way switch 104 in the circuit because when switch 104 breaks the circuit, power no longer is provided to the microcontroller of the smart dimmer (in place of the dimmer 152) because current no longer flows through the dimmer to the lighting load 108. The three-way and four-way dimmer switch according to the present invention provides a solution to this problem and also optionally provides a means for remote control of the switch.

In one prior art remote control lighting control system, a single multi-location dimmer and up to nine "accessory" dimmers can be installed on the same circuit to enable dimming from a plurality of controls. In the prior art, accessory dimmers are necessary because prior art multi-location dimmers are incompatible with mechanical three-way switches. Accessory dimmers installed throughout a house can greatly increase the cost of the components and of the installation of a dimming system.

Moreover, even though the multiple location lighting control system 200 allows for the use of a smart dimmer switch in a three-way system, it is necessary for the customer to purchase the remote switch 204 along with the smart dimmer switch 202. Often, the typical customer is unaware that a remote switch is required when buying a smart dimmer switch for a three-way or four-way system until after the time of purchase when the smart dimmer switch is installed and it is discovered that the smart dimmer switch will not work properly with the existing mechanical three-way or four-way switch. Therefore, there exists a need for a smart dimmer that may be installed in any location of a three-way or four-way system without the need to purchase and install a special remote switch.

A smart three-way switch has also been designed that operates with a conventional mechanical three-way switch, but that system requires rewiring of the mechanical three-way switch in order to provide proper three-way operation from both locations. This is the subject of commonly assigned U.S. patent application Ser. No. 11/125,045, filed May 9, 2005, entitled DIMMER FOR USE WITH A THREE-WAY SWITCH, which is incorporated herein by reference in its entirety.

SUMMARY OF THE INVENTION

The present invention improves upon these and other shortcomings identified above, particularly with respect to the existing smart three-way and four-way dimmer switches, providing smart dimmer switches that can replace existing mechanical three-way and four-way switches and being fully operational with existing mechanical three-way and four-way switches without requiring rewiring or replacement of the other switches.

According to one aspect, the invention comprises a dimmer switch adapted to be coupled to a circuit including a power source, a load, and a standard SPDT three-way switch. The dimmer switch comprises first, second, and third electrical load terminals, and a controllably conductive device electrically coupled to the first, second, and third load terminals. The controllably conductive device has a conductive state in which the controllably conductive device is controlled such that a desired amount of power is delivered to the load and a non-conductive state in which the controllably conductive device is controlled such that substantially no power is delivered to the load. The controllably conductive device is arranged such that when the controllably conductive device is in a conductive state, a current to the load flows between the first terminal and the second terminal or between the first terminal and the third terminal. The dimmer switch further comprises a sensing device electrically coupled to at least one of the second terminal and the third terminal and a controller operably coupled to the controllably conductive device and to the sensing device. The controller is operable to control the controllably conductive device in response to an output of the sensing device in accordance with an electrical characteristic. The dimmer switch further comprises a power supply coupled in shunt electrical connection with the controllably conductive device and operable to provide power to the controller. In a preferred embodiment, the sensing device comprises a current transformer for sensing a current through one of the second load terminal and the third load terminal.

According to another aspect, the invention comprises a dimmer switch adapted to be coupled to a circuit including a power source, a load, and a standard SPDT three-way switch, and comprising a first controllably conductive device and a second controllably conductive device. The dimmer switch also includes first, second and third electrical load terminals, with the first controllably conductive device electrically coupled between the first load terminal and the second load terminal and the second controllably conductive device coupled between the first and the third load terminals. The first controllably conductive device is arranged such that a current flows to the load between the first load terminal and the second load terminal when the first controllably conductive device is in the conductive state. The second controllably conductive device is arranged such that a current flows to the load between the first load terminal and the third load terminal when the second controllably conductive device is in the conductive state. The dimmer switch also includes a controller electrically coupled to the controllably conductive devices and operable to control the controllably conductive devices between the conductive state and the non-conductive state, and a power supply coupled to the first, second, and third load terminals and operable to provide power to the controller. In a preferred embodiment, the dimmer switch further comprises a first sensing device and a second sensing device. The first sensing device is electrically coupled to the second terminal and is operable to sense a first electrical characteristic associated with the second load terminal. The second sensing device is electrically coupled to the third terminal and is operable to sense a second electrical characteristic associated with the third load terminal. The controller is further operable to control the first and second controllably conductive devices in response to an output of the first sensing device in accordance with the first electrical characteristic and in response to an output of the second sensing device in accordance with the second electrical characteristic.

According to yet another aspect, the invention comprises a dimmer switch adapted to be coupled to a circuit including a power source, a load, a first standard SPDT three-way switch, and a second standard SPDT three-way switch. The dimmer switch comprises first, second, third, and fourth electrical load terminals, and a controllably conductive device electrically coupled between the first load terminal and the third load terminal for carrying a load current to the load. The controllably conductive device is arranged such that when the controllably conductive device is in the conductive state, a current to the load flows from one of the first load terminal and the second load terminal to one of the third load terminal and the fourth load terminal. The dimmer switch includes a first sensing device electrically coupled between the first load terminal and the second load terminal and adapted to carry the load current through the second load terminal. The first sensing device is operable to sense a first electrical characteristic associated with the second load terminal. The dimmer switch includes a second sensing device electrically coupled between the third load terminal and the fourth load terminal and adapted to carry the load current through the fourth load terminal. The second sensing device is operable to sense a second electrical characteristic associated with the fourth load terminal. The dimmer switch further includes a controller operably coupled to the controllably conductive device and to the first and second sensing devices. The controller is operable to control the controllably conductive device in response to an output of the first sensing device and an output of the second sensing device. The dimmer switch also includes a power supply coupled in shunt electrical connection with the controllably conductive device to provide power to the controller.

According to another aspect, the invention comprises a dimmer switch adapted to be coupled to a circuit including an AC power source, a load, and a single-pole double-throw three-way switch, the three-way switch comprising a first fixed contact, a second fixed contact, and a movable contact adapted to be coupled to either the power source or the load. The three-way switch has a first state in which the movable contact is contacting the first fixed contact and a second state in which the movable contact is contacting the second fixed contact. The dimmer switch comprises:

a first load terminal adapted to be coupled to either the power source or the load to which the three-way switch is not coupled;

a second load terminal adapted to be coupled to the first fixed contact of the three-way switch;

a third load terminal adapted to be coupled to the second fixed contact of the three-way switch;

a controllably conductive device electrically coupled to the first, second, and third load terminals, the controllably conductive device having a conductive state in which the controllably conductive device is controlled so as to be operable to deliver a desired amount of power to the load and a non-conductive state in which the controllably conductive device is controlled so as to be operable to deliver substantially no power to the load, the controllably conductive device arranged such that when the controllably conductive device is in the conductive state and the dimmer switch is coupled to the circuit, the controllably conductive device is operable to allow a current to the load to flow between the first terminal and the second terminal or between the first terminal and the third terminal for at least a portion of each half-cycle of the AC power source;

a sensing device electrically coupled to at least one of the second load terminal and the third load terminal, such that when the at least one of the second load terminal and the third load terminal is coupled to the three-way switch, the sensing device is operable to sense an electrical characteristic associated with the load terminal to which the sensing device is coupled;

a controller operably coupled to the controllably conductive device and to the sensing device, the controller operable to control the controllably conductive device in response to an output of the sensing device in accordance with the electrical characteristic; and a power supply electrically coupled in shunt electrical connection with the controllably conductive device and operable to provide power to the controller.

According to another aspect, the invention comprises a dimmer switch adapted to be coupled to a circuit including an AC power source having a hot connection and a neutral connection, a load, and a single-pole double-throw three-way switch, the three-way switch comprising a first fixed contact, a second fixed contact, and a movable contact adapted to be coupled to either the power source or the load. The three-way switch has a first state in which the movable contact is contacting the first fixed contact and a second state in which the movable contact is contacting the second fixed contact. The dimmer switch comprises:

a first load terminal adapted to be coupled to either the power source or the load to which the three-way switch is not coupled;

a second load terminal adapted to be coupled to the first fixed contact of the three-way switch;

a third load terminal adapted to be coupled to the second fixed contact of the three-way switch;

a controllably conductive device electrically coupled to the first, second, and third load terminals, the controllably conductive device having a conductive state in which the controllably conductive device is controlled so as to be operable to deliver a desired amount of power to the load and a non-conductive state in which the controllably conductive device is controlled so as to be operable to deliver substantially no power to the load, the controllably conductive device arranged such that when the controllably conductive device is in the conductive state and the dimmer switch is coupled to the circuit, the controllably conductive device is operable to allow a current to the load to flow between the first load terminal and the second load terminal or between the first load terminal and the third load terminal for at least a portion of each half-cycle of the AC power source;

a sensing device electrically coupled to at least one of the second load terminal and the third load terminal, such that when the at least one of the second load terminal and the third load terminal is coupled to the three-way switch, the sensing device is operable to sense electrical continuity between the hot connection and the neutral connection of the power source through the controllably conductive device and the load;

a controller operably coupled to the controllably conductive device and to the sensing device, the controller operable to control the controllably conductive device in response to an output of the sensing device; and a power supply electrically coupled in shunt electrical connection with the controllably conductive device and operable to provide power to the controller.

According to a still further aspect, this invention comprises a method for controlling a load in a circuit comprising an AC power source, the load, a dimmer switch, and a single-pole double-throw three-way switch, the three-way switch comprising a first fixed contact, a second fixed contact, and a movable contact adapted to be coupled to either the power source or the load, the three-way switch having a first state in which the movable contact is contacting the first fixed contact and a second state in which the movable contact is contacting the second fixed contact, the method comprising the steps of:

providing a first load terminal on the dimmer switch, the first load terminal adapted to be coupled to either the power source or the load to which the three-way switch is not coupled;

providing a second load terminal on the dimmer switch, the second load terminal adapted to be coupled to the first fixed contact of the three-way switch;

providing a third load terminal on the dimmer switch, the third load terminal adapted to be coupled to the second fixed contact of the three-way switch;

electrically coupling a controllably conductive device to the first, second, and third load terminals, the controllably conductive device having a conductive state in which the controllably conductive device is controlled so as to be operable to deliver a desired amount of power to the load and a non-conductive state in which the controllably conductive device is controlled so as to be operable to deliver substantially no power to the load;

sensing an electrical characteristic associated with at least one of the second load terminal and the third load terminal when the at least one of the second load terminal and the third load terminal is coupled to the three-way switch; and controlling the controllably conductive device in accordance with the sensed electrical characteristic, such that the controllably conductive device is operable to allow a current through the load to flow between the first load terminal and the second load terminal, or between the first load terminal and the third load terminal for at least a portion of each half-cycle of the AC power source.

According to another aspect the invention comprises a system for supplying power to a load from an AC power source comprising:

a single-pole double-throw (SPDT) three-way switch comprising a first fixed contact, a second fixed contact, and a movable contact adapted to be coupled to either the power source or the load, the SPDT three-way switch having a first state in which the movable contact is contacting the first fixed contact and a second state in which the movable contact is contacting the second fixed contact; and a dimmer switch comprising:

a first load terminal adapted to be coupled to either the power source or the load to which the SPDT three-way switch is not coupled to;

a second load terminal coupled to the first fixed contact of the SPDT three-way switch;

a third load terminal coupled to the second fixed contact of the SPDT three-way switch;

a controllably conductive device electrically coupled such that when the controllably conductive device is in a conductive state, a desired amount of power is capable of being delivered to the load, and when the controllably conductive device is in a non-conductive state, substantially no power is capable of being delivered to the load;

a controller electrically coupled to the controllably conductive device and operable to control the controllably conductive device; and a power supply electrically coupled in shunt electrical connection with the controllably conductive device and operable to provide power to the controller;

wherein when the SPDT three-way switch is in the first state, the controller is operable to control the controllably conductive device such that the controllably conductive device is operable to allow a current to the load to flow through the second load terminal for at least a portion of each half-cycle of the AC power source when the controllably conductive device is in the conductive state; and wherein when the SPDT three-way switch is in the second state, the controller is operable to control the controllably conductive device such that the controllably conductive device is operable to allow the current to the load to flow through the third load terminal for at least a portion of each half-cycle of the AC power source when the controllably conductive device is in the conductive state.

According to yet another aspect of the present invention, a dimmer switch comprises first, second, and third electrical load terminals; a controllably conductive device electrically coupled to the first, second, and third load terminals; a sensing device electrically coupled to at least one of the second load terminal and the third load terminal; a controller electrically coupled to the controllably conductive device and to the sensing device; and a power supply electrically coupled in shunt electrical connection with the controllably conductive device and operable to provide power to the controller. The controllably conductive device is arranged such that when the controllably conductive device is in the conductive state, a current to the load flows between the first load terminal and the second load terminal, or between the first load terminal and the third load terminal. The sensing device is operable to sense continuity between the hot connection and the neutral connection of the power source through the controllably conductive device and the load. The controller is operable to control the controllably conductive device in response to an output of the sensing device.

The present invention further provides a method for controlling a load in a circuit comprising a power source, the load, a dimmer switch, and a standard SPDT three-way switch. The method comprises the steps of providing first, second, and third electrical load terminals on the dimmer switch, and electrically coupling a controllably conductive device to the first, second, and third load terminals. The controllably conductive device has a conductive state in which the controllably conductive device is controlled such that a desired amount of power is delivered to the load and a non-conductive state in which the controllably conductive device is controlled such that substantially no power is delivered to the load. The method further comprises the steps of sensing an electrical characteristic associated with at least one of the second load terminal and the third load terminal, and controlling the controllably conductive device in response to the step of sensing in accordance with the electrical characteristic, such that a current to the load flows between the first load terminal and the second load terminal, or between the first load terminal and the third load terminal. In a preferred embodiment, the step of sensing comprises sensing a current through one of the second load terminal and the third load terminal.

According to another aspect of the present invention, a method for controlling a load comprises the steps of providing first, second, and third electrical terminals, electrically coupling a first controllably conductive device between the first load terminal and the second load terminal, and electrically coupling a second controllably conductive device between the first load terminal and the third load terminal. The first controllably conductive device is arranged such that when the first controllably conductive device is in the conductive state, a current to the load flows between the first load terminal and the second load terminal and the second controllably conductive device is arranged such that when the second controllably conductive device is in the conductive state, the current to the load flows between the first load terminal and the third load terminal. The method further comprises the step of controlling the first and second controllably conductive devices between the conductive state and the non-conductive state. In a preferred embodiment the method further comprises the steps of sensing a first electrical characteristic associated with the second load terminal and sensing a second electrical characteristic associated with the third load terminal. Further, the step of controlling the first and second controllably conductive devices comprises controlling the first and second controllably conductive devices in response to the step of sensing the first electrical characteristic and the step of sensing the second electrical characteristic.

In addition, the present invention provides a system for supplying power to a load from a power source. The system comprises a standard single-pole double-throw (SPDT) three-way switch comprising a first fixed contact, a second fixed contact, and a movable contact adapted to be coupled to one of the power source and the load. The SPDT three-way switch has a first state in which the movable contact is contacting the first fixed contact and a second state in which the movable contact is contacting the second fixed contact. The system further comprises a dimmer switch including a first load terminal adapted to be coupled to the one of the power source and the load that the SPDT three-way switch is not coupled to; a second load terminal coupled to the first fixed contact of the SPDT three-way switch; a third load terminal coupled to the second fixed contact of the SPDT three-way switch; a first controllably conductive device electrically coupled such that when the first controllably conductive device is in a conductive state, a desired amount of power is operable to be delivered to the load, and when the first controllably conductive device is in a non-conductive state, substantially no power is operable to be delivered to the load; a controller electrically coupled to the first controllably conductive device and operable to control the first controllably conductive device; and a power supply electrically coupled in shunt electrical connection with the first controllably conductive device and operable to provide power to the controller. When the SPDT three-way switch is in the first state, the controller is operable to control the first controllably conductive device such that a current to the load flows through the second load terminal. When the SPDT three-way switch is in the second state, the controller is operable to control the first controllably conductive device such that the current to the load flows through the third load terminal.

According to a first embodiment of the system, the dimmer switch further comprises a sensing device electrically coupled to at least one of the second load terminal and the third load terminal, the sensing device operable to sense an electrical characteristic associated with the load terminal to which the sensing device is coupled. The controller of the dimmer switch is operable to determine the state of the SPDT three-way switch in response to an output of the sensing device. According to a second embodiment of the system, the dimmer switch further comprises a second controllably conductive device; a first sensing device electrically coupled to the second load terminal and operable to sense a first electrical characteristic associated with the second load terminal; and a second sensing device electrically coupled to the third load terminal and operable to sense a second electrical characteristic associated with the third load terminal. The controller is operable to control the controllably conductive device in response to an output of the first sensing device in accordance with the first electrical characteristic and in response to an output of the second sensing device in accordance with the second electrical characteristic. The controller of the dimmer switch is operable to determine the state of the SPDT three-way switch in response to the outputs of the sensing devices.

According to yet another aspect, the present invention provides a system for supplying power to a load from a power source comprising a first standard single-pole double-throw (SPDT) three-way switch, a second standard SPDT three-way switch, and a dimmer switch. The first SPDT three-way switch comprises a first fixed contact, a second fixed contact, and a first movable contact adapted to be coupled to the power source. The first SPDT three-way switch has a first state in which the first movable contact is contacting the first fixed contact and a second state in which the first movable contact is contacting the second fixed contact. The second SPDT three-way switch comprises a third fixed contact, a fourth fixed contact, and a second movable contact adapted to be coupled to the load. The second SPDT three-way switch has a third state in which the second movable contact is contacting the third fixed contact and a fourth state in which the second movable contact is contacting the fourth fixed contact. The dimmer switch comprises a first load terminal coupled to the first fixed contact of the first SPDT three-way switch, a second load terminal coupled to the second fixed contact of the first SPDT three-way switch, a third load terminal coupled to the third fixed contact of the second SPDT three-way switch, and a fourth load terminal coupled to the fourth fixed contact of the second SPDT three-way switch. The dimmer switch is operable to control the power delivered to the load.

Other features and advantages of the present invention will become apparent from the following description of the invention that refers to the accompanying drawings.

BRIEF DESCRIPTION OF THE DRAWINGS

For the purpose of illustrating the invention, there is shown in the drawings a form, which is presently preferred, it being understood, however, that the invention is not limited to the precise arrangements and instrumentalities shown. The features and advantages of the present invention will become apparent from the following description of the invention that refers to the accompanying drawings, in which:

FIG. 10 is a flowchart of a control loop of the controller of the smart four-way dimmer of FIG. 8 for determining the state of the dimmer;

FIG. 11 is a flowchart of the process of the button routine of the control loop of FIG. 10;

DETAILED DESCRIPTION OF EMBODIMENTS OF THE INVENTION

Figure 1A:
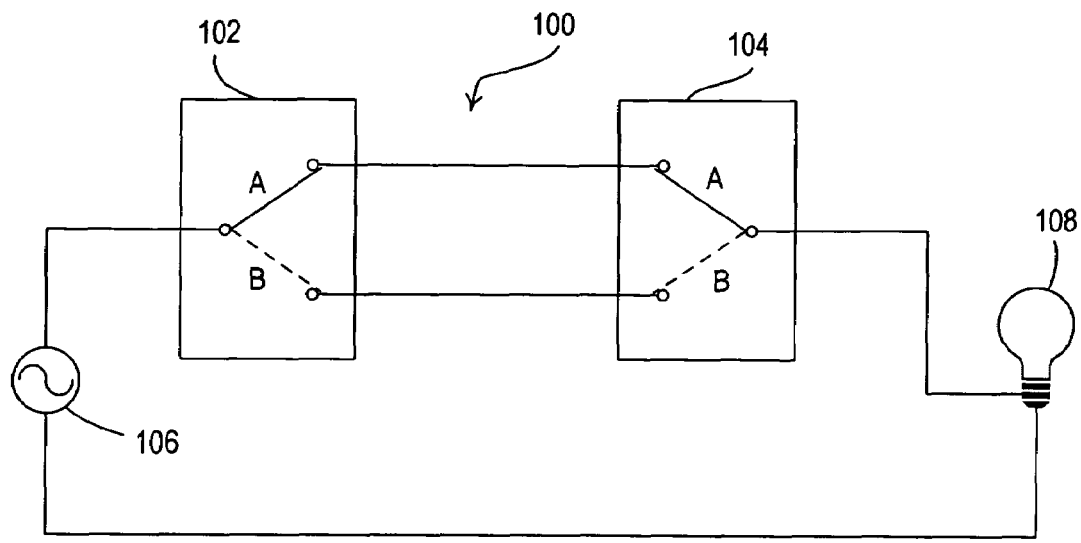
FIG. 1A shows a prior art three-way switch system, which includes two three-way switches.
Figure 1B:
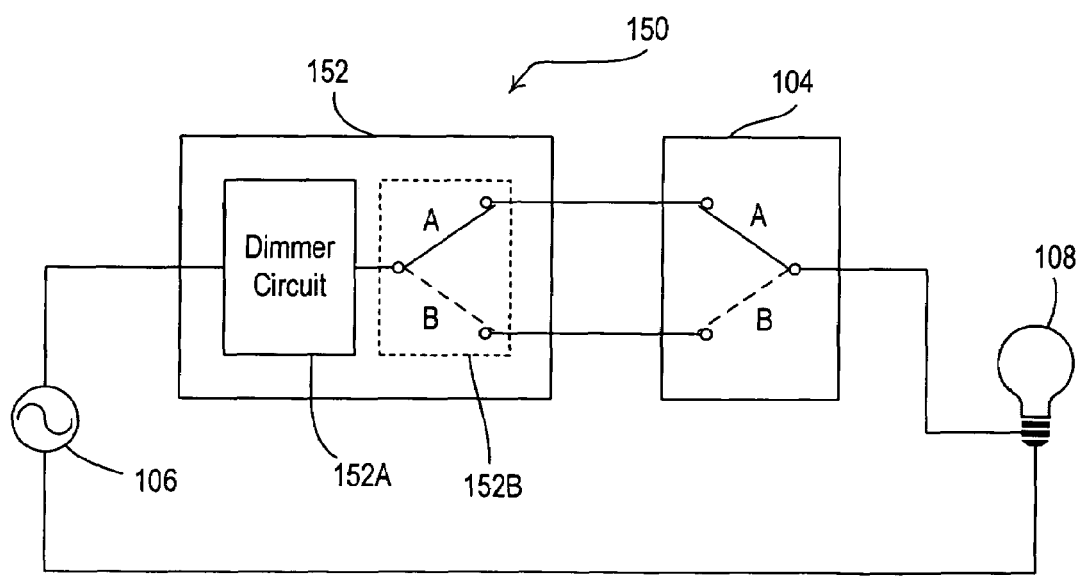
FIG. 1B shows an example of a prior art three-way dimmer switch system including one prior art three-way dimmer switch and one three-way switch.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 5A:
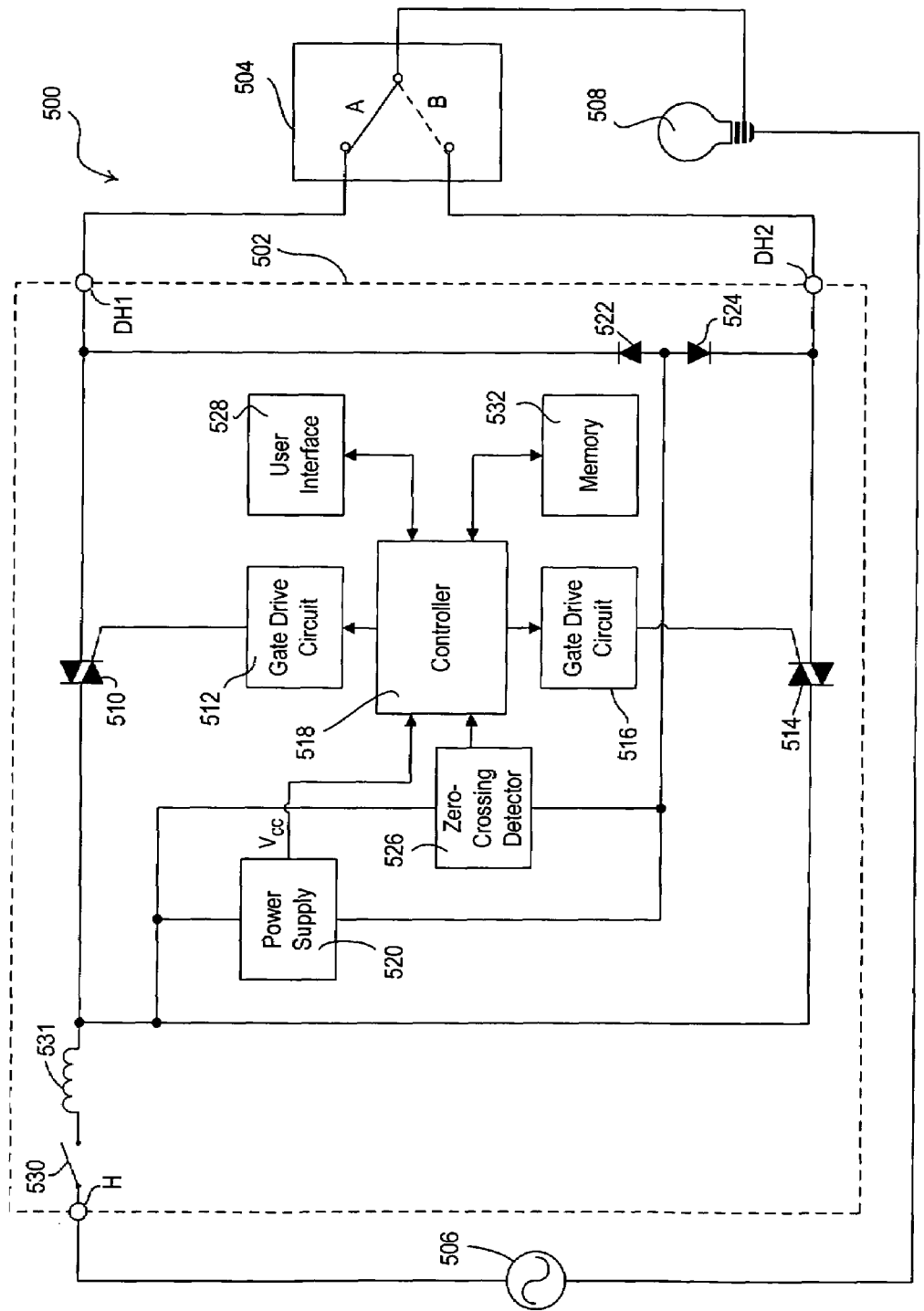
FIG. 5A is a simplified block diagram of a three-way lighting control system including a smart three-way dimmer according to the present invention.

FIG. 5A is a simplified block diagram of a three-way lighting control system 500 including a smart three-way dimmer switch 502 according to the present invention. The dimmer 502 and a standard three-way switch 504 are connected in series between an AC voltage source 506 and a lighting load 508. The dimmer 502 includes a hot terminal H that is coupled to the AC voltage source 506 and two dimmed hot terminals DH1, DH2 that are connected to the two fixed contacts of the three-way switch 504. The common terminal of the three-way switch 504 is coupled to the lighting load 508. Alternatively, the dimmer 502 could be connected on the load-side of the system 500 with the three-way switch 504 on the line-side. The dimmer 502 can be installed to replace an existing three-way switch without the need to replace the other existing three-way switch 504, and without the need for a wiring change to the three-way switch being replaced. The terminals H, DH1, DH2 of the dimmer 502 may be screw terminals, insulated wires or "flying leads", stab-in terminals, or other suitable means of connecting the dimmer to the AC voltage source 506 and the lighting load 508.

In this embodiment of the smart two-wire dimmer switch 502, two bidirectional semiconductor switches 510, 514 are used. The dimmer 502 implements each semiconductor switch as a triac. However, other semiconductor switching circuits may be used, such as, for example, two FETs in anti-series connection, or an insulated-gate bipolar junction transistor (IGBT). A first triac 510 is connected in series between the hot terminal H and the first dimmed hot terminal DH1. The first triac 510 has a gate (or control input) that is coupled to a first gate drive circuit 512. A second triac 514 is connected in series between the hot terminal H and the second dimmed hot terminal DH2 and has a gate that is coupled to a second gate drive circuit 516. The dimmer 502 further includes a controller 518 that is coupled to the gate drive circuits 512, 516 to control the conduction times of the triacs 510, 514 each half-cycle. The controller 518 is preferably implemented as a microcontroller, but may be any suitable processing device, such as a programmable logic device (PLD), a microprocessor, or an application specific integrated circuit (ASIC).

A power supply 520 generates a DC voltage, $V_{CC}$, to power the controller 518. The power supply 520 is coupled from the hot terminal H to the first dimmed hot terminal DH1 through a first diode 522 and to the second dimmed hot terminal DH2 through a second diode 524. This allows the power supply 520 to draw current through the first dimmed hot terminal DH1 when the three-way switch 504 is in position A and through the second dimmed hot terminal DH2 when the three-way switch 504 is in position B. The power supply 520 is able to charge when the triacs 510, 514 are both not conducting and there is a voltage potential developed across the dimmer 520.

The dimmer 502 further includes a zero-crossing detector 526 that is also coupled between the hot terminal H and the dimmed hot terminals DH1, DH2 through the diodes 522, 524, respectively. The zero-crossing detector 526 provides a control signal to the controller 518 that identifies the zero-crossings of the AC supply voltage. The controller 518 determines when to turn on the triacs 510, 514 each half-cycle by timing from each zero-crossing of the AC supply voltage.

A user interface 528 is coupled to the controller 518 and to allow a user to determine a desired lighting level (or state) of the lighting load 508. The user interface 528 provides a plurality of actuators for receiving inputs from a user. For example, the user interface 528 may comprise a toggle button 560 (i.e., a tap switch) and an intensity actuator 570 (i.e., a slider control) as shown in FIG. 5C. In response to an actuation of the toggle button 560, the controller 518 will toggle the state of the lighting load 508 (i.e., from on to off and vice versa) by changing which one of the two triacs 510, 514 is conducting. The controller 518 drives the triacs 510, 514 conduct on a complementary basis, such that only one of the two triacs operable to conduct at a single time. In this way, the dimmer 502 operates similarly to a standard SPDT switch by allowing current to either flow through the first dimmed hot terminal DH1 or the second dimmed hot terminal DH2 solely in response to an actuation of the toggle button 560. Alternatively, the user interface 528 may include a separate on button and off button, which will cause the lighting load 508 to turn on and off, respectively. Movement of the intensity actuator 570 will cause the dimmer 502 to control the intensity of the lighting load 508. The dimmer 502 further includes an airgap switch 530 for preventing current flowing through either of the triacs 510, 514, and an inductor 531 for providing electromagnetic interference (EMI) filtering.

When the three-way switch 504 is in position A and the desired state of the lighting load 508 is on, the controller 518 will turn the first triac 510 on for a portion of each half-cycle, while maintaining the second triac 514 in the non-conducting state. If the three-way switch 504 is then toggled from position A to position B, current will not flow to the lighting load 508 since the second triac 514 is not conducting. Therefore, the lighting load 508 will not be illuminated. Alternatively, if the three-way switch 504 is in position A, the lighting load 508 is on, and the toggle button of the user interface 528 is actuated, the controller 518 will cause the first triac 510 to stop conducting and the second triac 514 to begin conducting. The lighting load 508 will be off because the controller 518 is driving the second triac 514 while the three-way switch 504 is in position A. If the toggle button of the user interface 528 is actuated again, the controller 518 will stop driving the second triac 514 and will cause the first triac 510 to begin conducting, thus causing the lighting load 508 to illuminate again.

Similarly, when the three-way switch 504 is in position B and the desired state of the lighting load 508 is on, the controller 518 will turn the second triac 514 on for a portion of each half-cycle, while maintaining the first triac 510 in the non-conducting state. If the three-way switch 504 is then switched to position A, the current path to the lighting load 508 is interrupted and the lighting load will be off. Also, if the three-way switch 504 is in position B, the lighting load 508 is on, and the toggle button of the user interface 528 is actuated, the controller 528 will cause the second triac 514 to stop conducting and the first triac 510 to begin conducting. The lighting load 508 will be off because the first triac 510 is conducting and the three-way switch 504 is in position B.

The power supply 520 preferably has a large enough storage capacitor to power the controller 518 during the times when the three-way switch 504 is transitioning from position A to position B and vice versa. For example, as the three-way switch 504 is toggled, current temporarily will not flow through either of the dimmed hot terminals DH1, DH2 as the movable contact transitions and the power supply 520 will provide power to the controller 518 by virtue of the internal storage capacitor. The amount of power that the power supply 504 needs to provide when the three-way switch 504 is transitioning is dependent on the transitioning time required for the movable contact to move from one fixed contact to the other.

However, it is not always possible to guarantee that the power supply 520 will be able to power the controller 518 and other low voltage circuitry during the time when the three-way switch 504 is transitioning between positions. Because of space limitations in a wall-mountable dimmer switch, it is not possible to simply include a particularly large storage capacitor in the power supply 520 to provide power during the transitioning time. Also, since the transitioning time is dependent on the force that a user exerts on the actuator of the three-way switch 504, the transitioning time can vary widely from one transition to the next. All three-way switches 504 include a region of "dead travel", i.e., when the movable contact of the three-way switch is approximately half way between position A and position B and is not contacting either of the fixed contacts. Sometimes, it is possible for the three-way switch 504 to be sustained in the region of dead travel, such that no current may flow through the power supply 520 for an indeterminate period of time.

Accordingly, the dimmer 502 includes a memory 532 that enables the dimmer 502 to return to the appropriate state, i.e., to control the correct one of the two triacs 510, 514, if power to the dimmer 502 is temporarily lost when the three-way switch 504 is transitioning. The memory 532 is coupled to the controller 518. Whenever the toggle button of the user interface 528 is actuated, the controller 518 stores in the memory 532, which one of the triacs 510, 514 is presently being controlled. In this way, if dimmer 502 temporarily loses power and the DC voltage $V_{CC}$ falls below a level that allows for proper operation of the controller 518, the controller will read from the memory 532 which triac 510, 514 to control at "power up", i.e. when the DC voltage $V_{CC}$ rises back above the level that ensures proper operation of the controller.

Figure 5B:
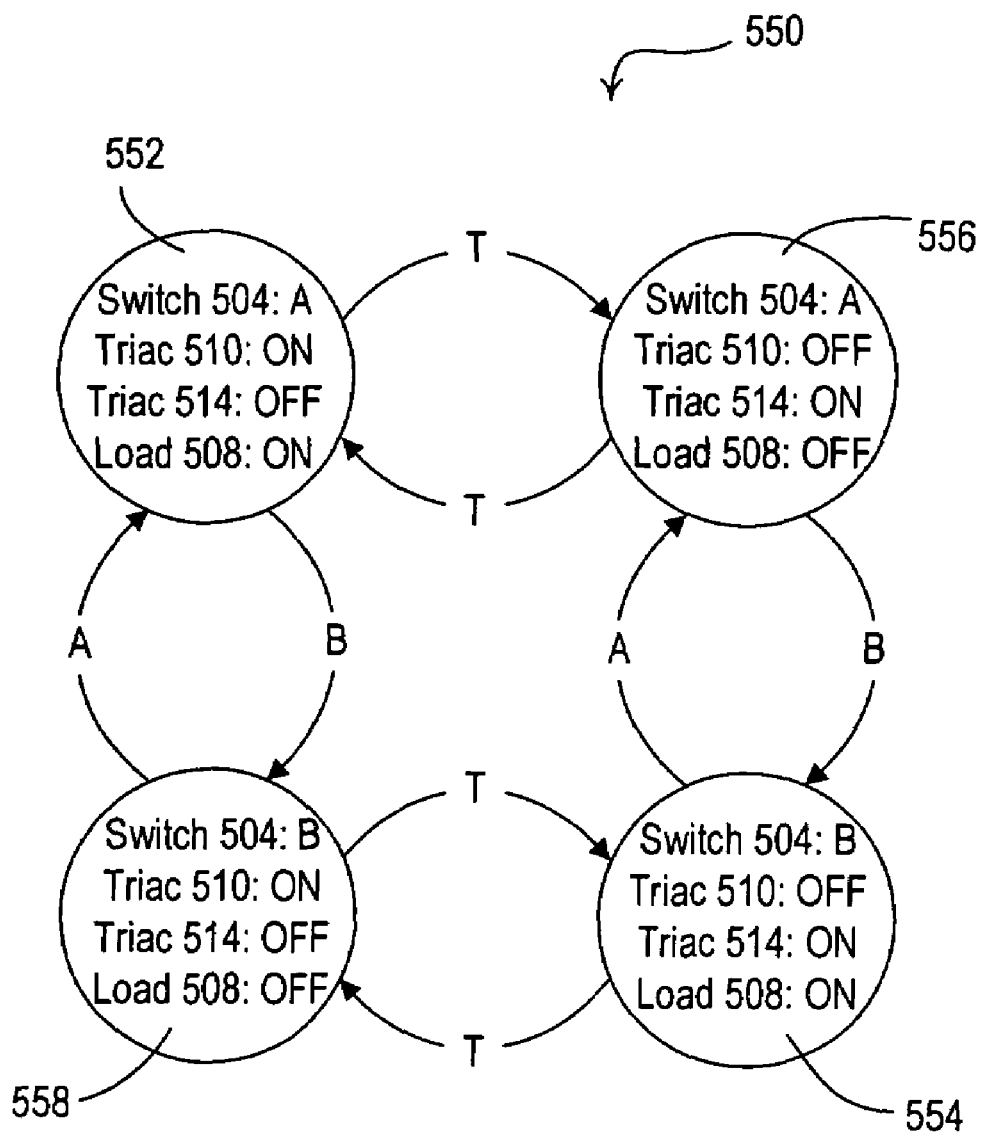
FIG. 5B shows a state diagram summarizing the operation of the lighting control system of FIG. 5A.
Figure 5C:
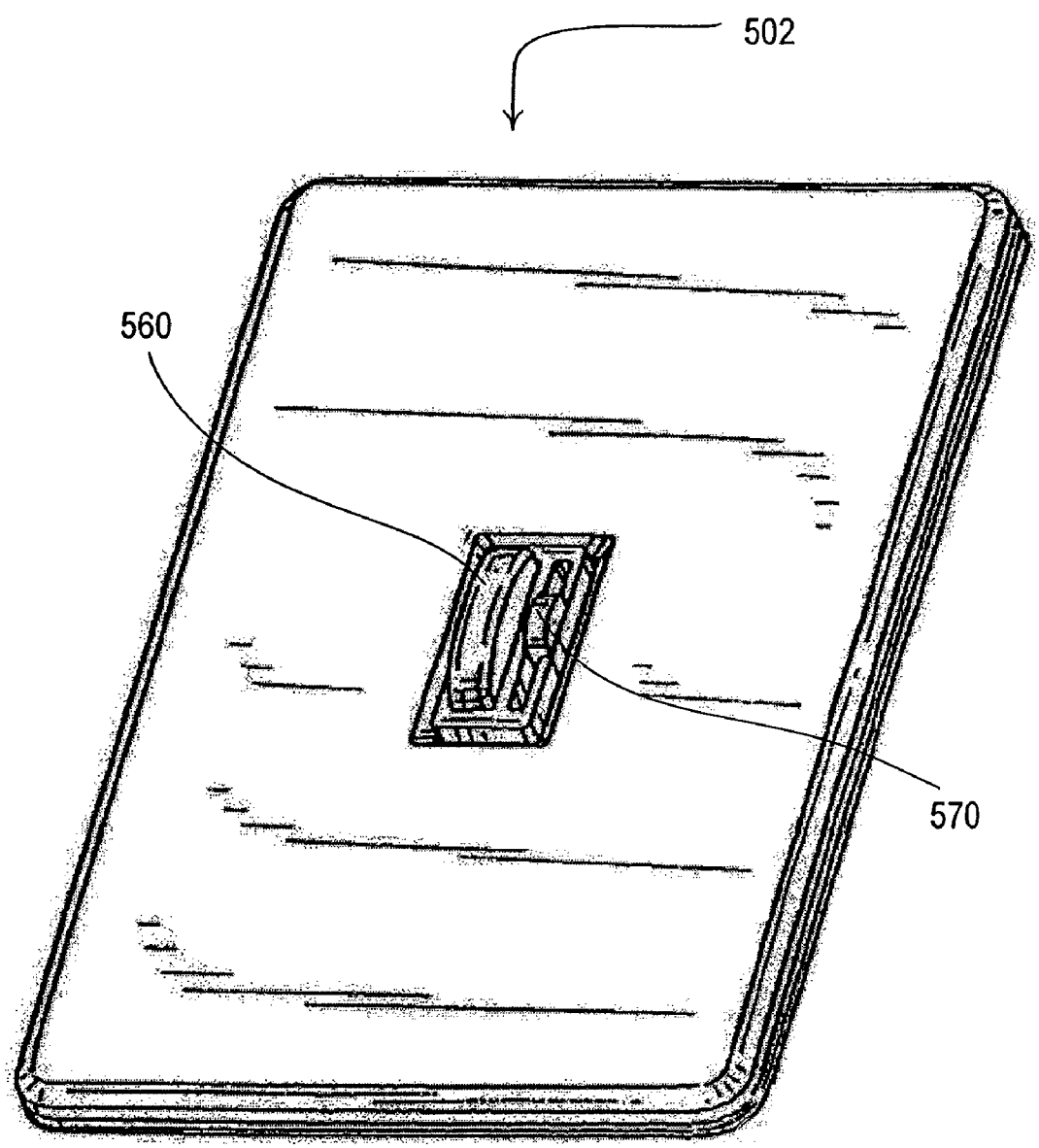
FIG. 5C is a perspective view of a user interface of the smart three-way dimmer of FIG. 5A.

FIG. 5B shows a state diagram 550 summarizing the operation of the lighting control system 500 of FIG. 5A. Two states 552, 554 are shown in which the lighting load 508 will be on since the three-way switch 504 is in the correct position to complete the circuit through the conducting triac. For example, at state 552, when the three-way switch 504 is in position A, the first triac 510 is able to conduct current to thus control the lighting load 508. The state diagram 550 also includes two states 556, 558 in which the lighting load 508 will be off since the three-way switch 504 is not in a position to conduct current through the triac that is enabled for conduction. A transition between states can be caused by one of three actions: a toggle of the three-way switch 504 from position A to position B (designated by 'B' in FIG. 5B), a toggle of the three-way switch 504 from position B to position A (designated by 'A'), and an actuation of the toggle switch of the user interface 528 (designated by 'T').

Figure 6A:
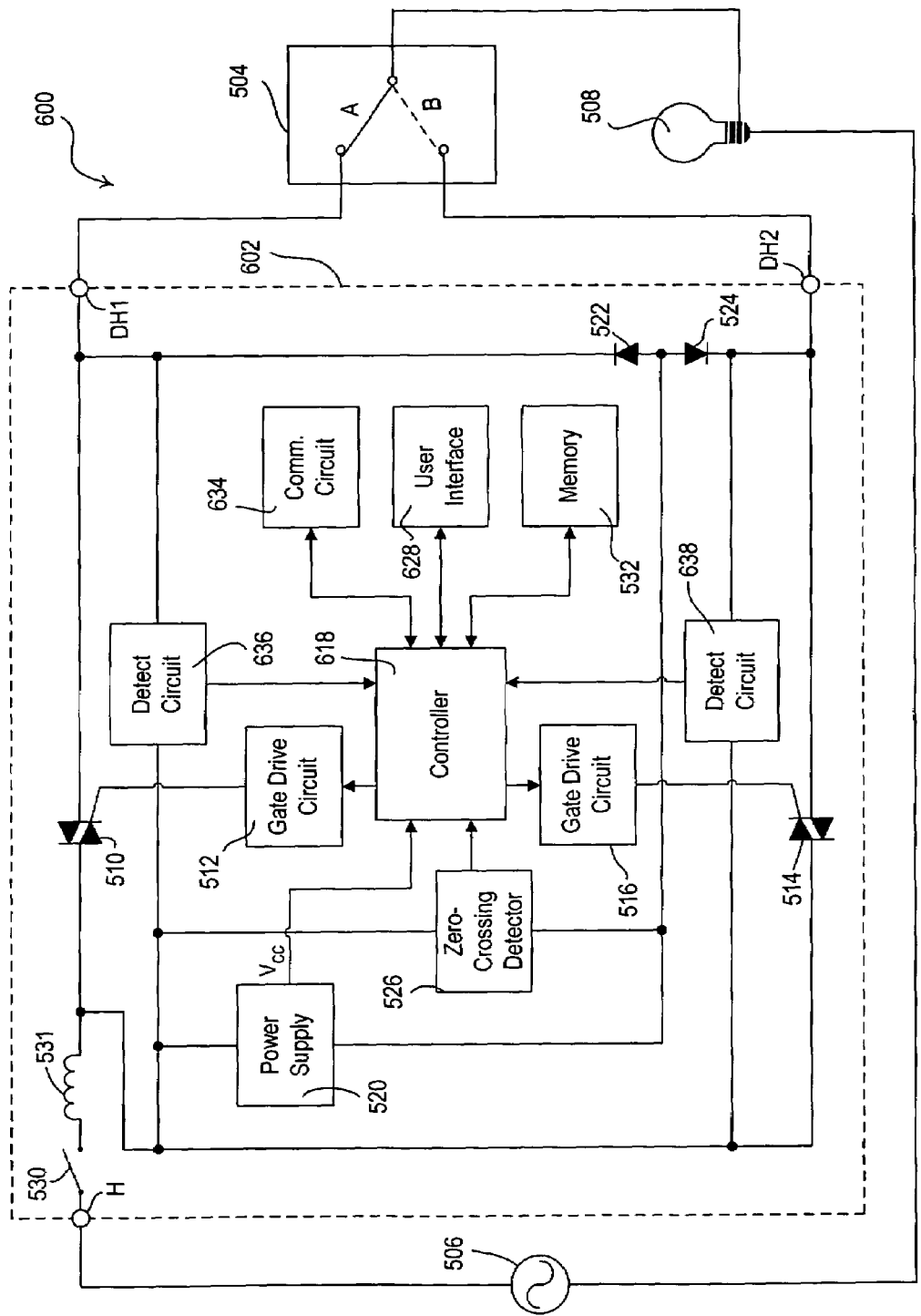
FIG. 6A is a simplified block diagram of a three-way lighting control system including a second embodiment of a smart three-way dimmer according to the present invention.

FIG. 6A shows a simplified block diagram of a three-way lighting control system 600 including a second embodiment of a smart three-way dimmer switch 602 according to the present invention. A first detect circuit (or sensing circuit) 636 is coupled across the first triac 510 and a second detect circuit (or sensing circuit) 638 is coupled across the second triac 514. The detect circuits 636, 638 provide control signals to the controller 618 representative of electrical characteristics of the first dimmed hot terminal DH1 and the second dimmed hot terminal DH2, respectively. Each of the electrical characteristics may be a voltage developed across one of the respective triacs. Alternatively, the detect circuits 636, 638 may be placed in series with the dimmed hot terminals DH1, DH2 and the electrical characteristics may be currents through the dimmed hot terminals. In essence, the sensing of the electrical characteristics provides a determination of whether a path of continuity exists between hot and neutral of the AC voltage source 506 through the lighting load 508, the three-way switch 504, and the three-way dimmer switch 602, at either the first dimmed hot terminal DH1 or the second dimmed hot terminal DH2.

Figure 3:
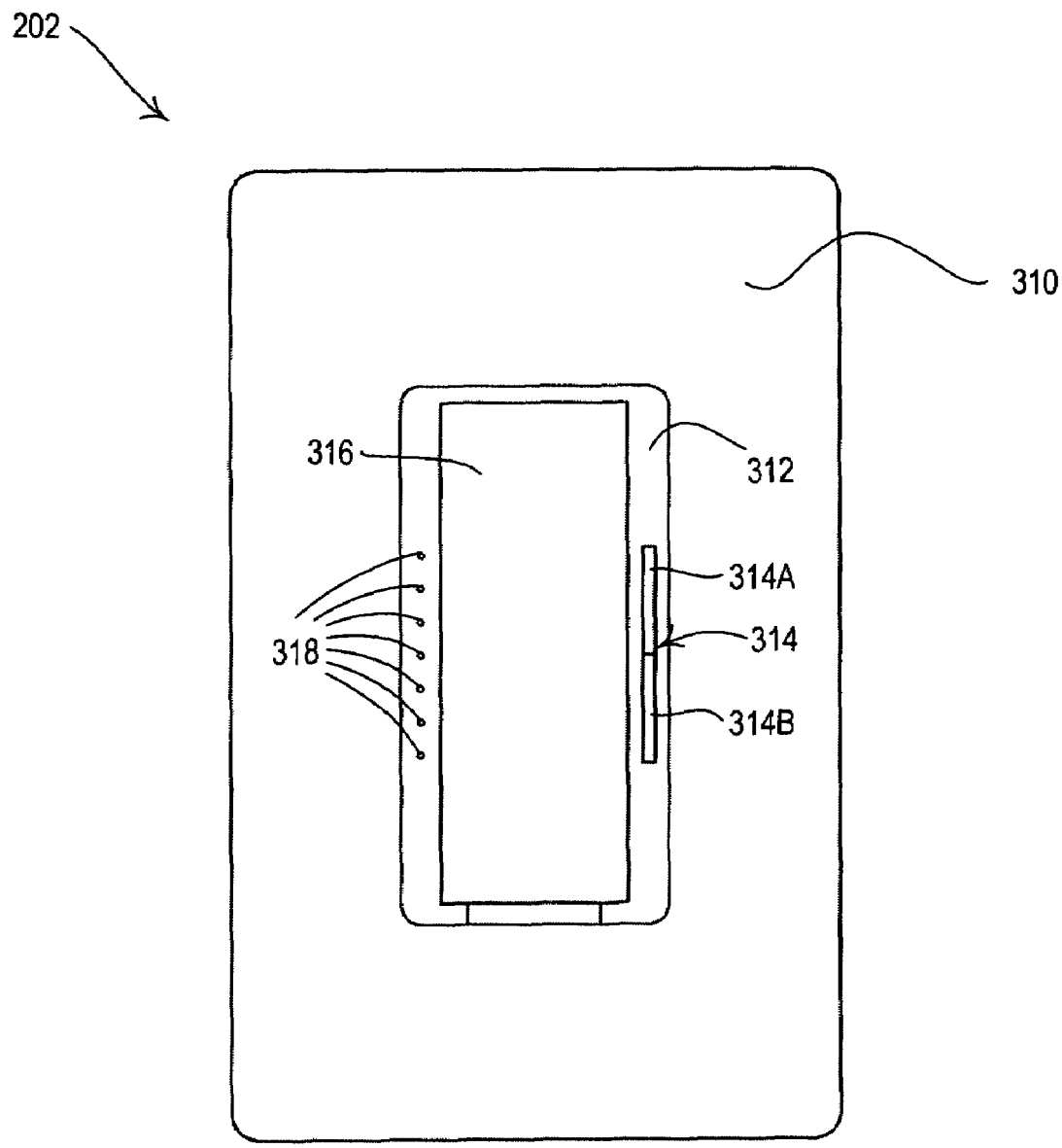
FIG. 3 shows the prior art user interface of the dimmer switch of the multiple location lighting control system of FIG. 2.
Figure 4:
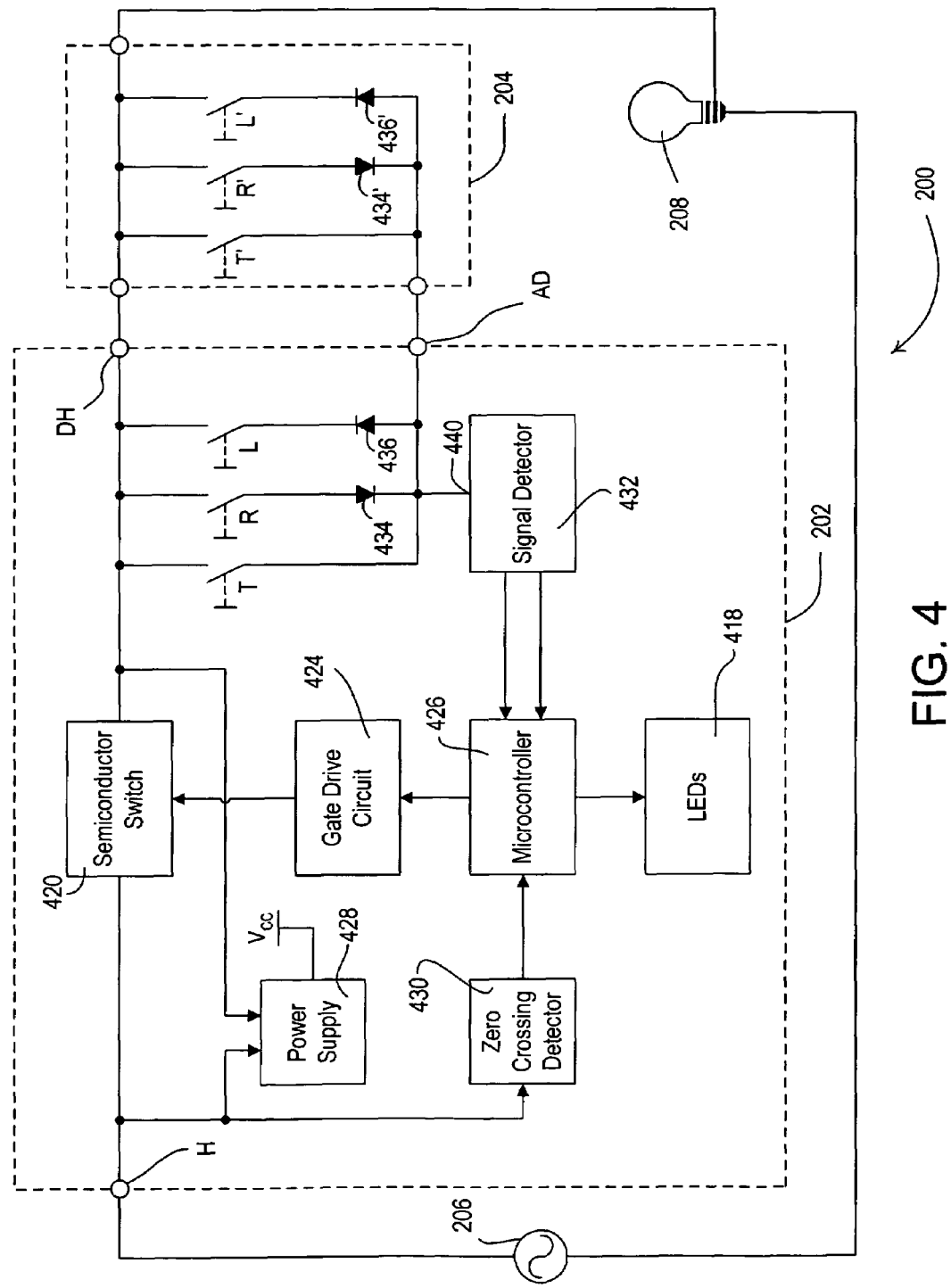
FIG. 4 is a simplified block diagram of the dimmer switch and the remote switch of the prior art multiple location lighting control system of FIG. 2.

The controller 618 uses this information to determine the position of the three-way switch 504 in the system 600. For example, when the three-way switch 504 is in position A and the first triac 510 is non-conductive, a voltage will develop across the first detect circuit 636, which will output a signal indicating that the three-way switch 504 is in position A. Similarly, when the three-way switch 504 is in position B, the second detect circuit 638 will output a corresponding signal to the controller 618. The controller 618 uses the information of the state of the three-way switch 504 to provide feedback to the user via a plurality of LEDs on a user interface 628 and may provide feedback information to other control devices via an optional communication circuit 634. For example, the user interface 628 may be the same as the user interface shown in FIG. 3.

The communication circuit 634 may be coupled to a communications link, for example, a wired serial control link, a power-line carrier (PLC) communication link, or a wireless communication link, such as an infrared (IR) or a radio frequency (RF) communication link. An example of an RF lighting control system is described in commonly assigned U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS.

Instead of providing complementary control of the triacs 510, 514, the controller 618 could control the triacs to the same state at the same time. For example, when the first triac 510 is conducting and the second voltage detect circuit 638 determines that the three-way switch 504 has been toggled to position B, the controller could cause both triacs to stop conducting since the desired lighting level of the lighting load 508 is off. When neither triac 510, 514 is conducting, substantially no power, i.e., only an amount of power that will not illuminate the lighting load 508, is conducted to the lighting load.

Accordingly, the controller is operable to detect a change of the position of the three-way switch 504 and can determine when to toggle power to the load based on the three-way switch position change and the present state of the dimmer. Thus, the embodiments shown in FIGS. 5A and 6A are compatible with a mechanical three-way switch 504.

Figure 6B:
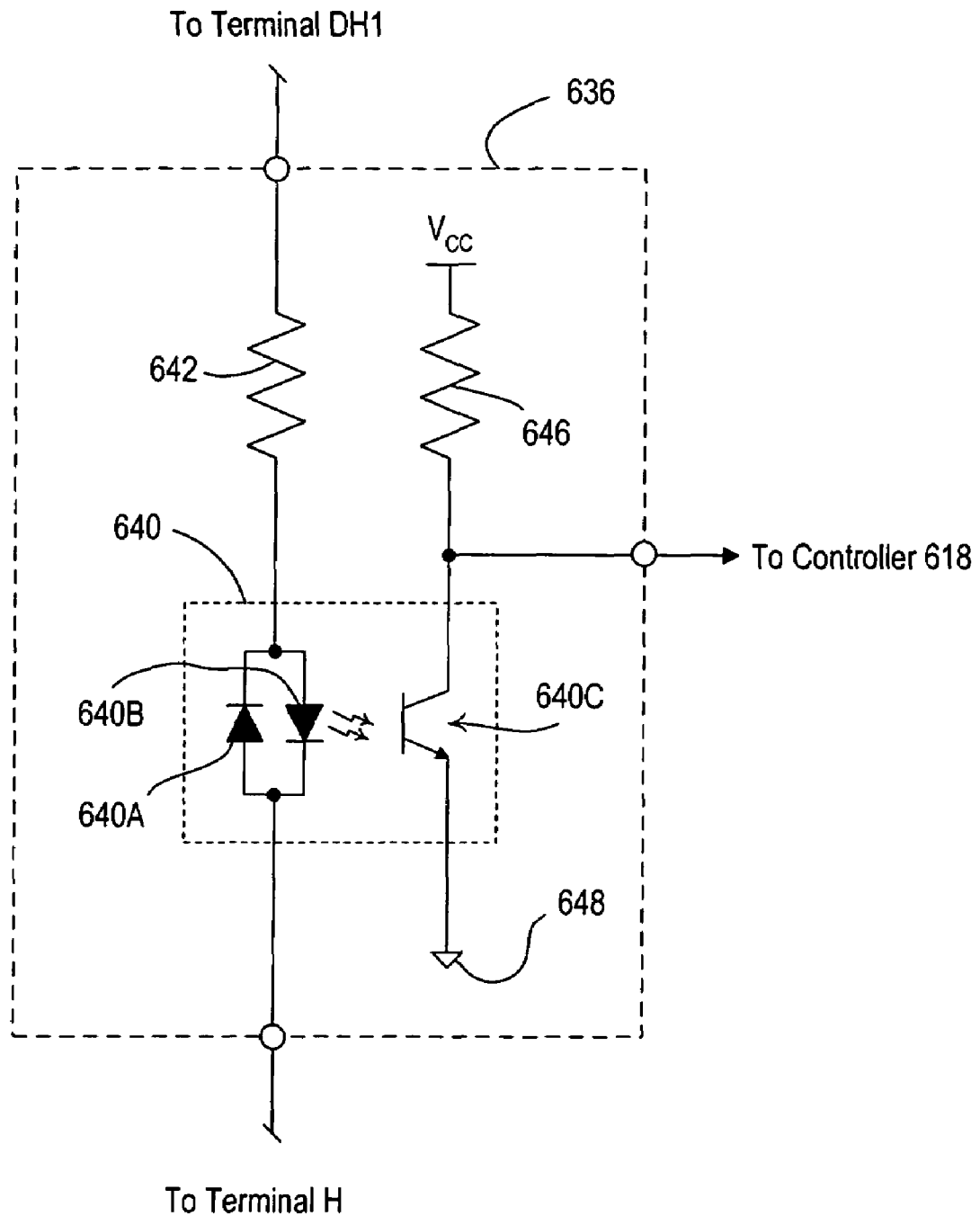
FIG. 6B is a simplified schematic diagram of a first detect circuit of the dimmer of FIG. 6A.

FIG. 6B is a simplified schematic diagram of a possible implementation of the first detect circuit 636. Since the voltage provided across the detect circuit 636 is an AC line voltage, the detect circuit includes an optocoupler 640. A resistor 642 is provided in series with the photodiodes 640A, 640B of the optocoupler 640 to limit the current through the photodiodes. The voltage at the collector of the phototransistor 640C of the optocoupler 640 is provided to the controller 618. A resistor 646 is provided in series with the phototransistor 640C to pull the voltage provided to the controller 618 up to the DC voltage VCC of the power supply 520 when the phototransistor is not conducting (i.e., when there is no voltage across the detect circuit 636).

When a voltage is produced across the detect circuit 636, current flows through the photodiode 640A in the positive half-cycles and the photodiode 640B in the negative half-cycles. Hence, the phototransistor 640C conducts and the voltage at the collector of the phototransistor is pulled down to a circuit common 648. The schematic diagram of the second detect circuit 638 is identical to the schematic diagram of the first detect circuit 636 shown in FIG. 6B, differing only in the fact that the second detect circuit 638 is connected between the hot terminal H and the second dimmed hot terminal DH2. Alternatively, the first and second detect circuits 636, 638 could be implemented as a simple resistive circuit (not shown), for example, a resistor divider, with the controller 518 operable to detect a voltage produced by the resistive circuit.

Figure 7A:
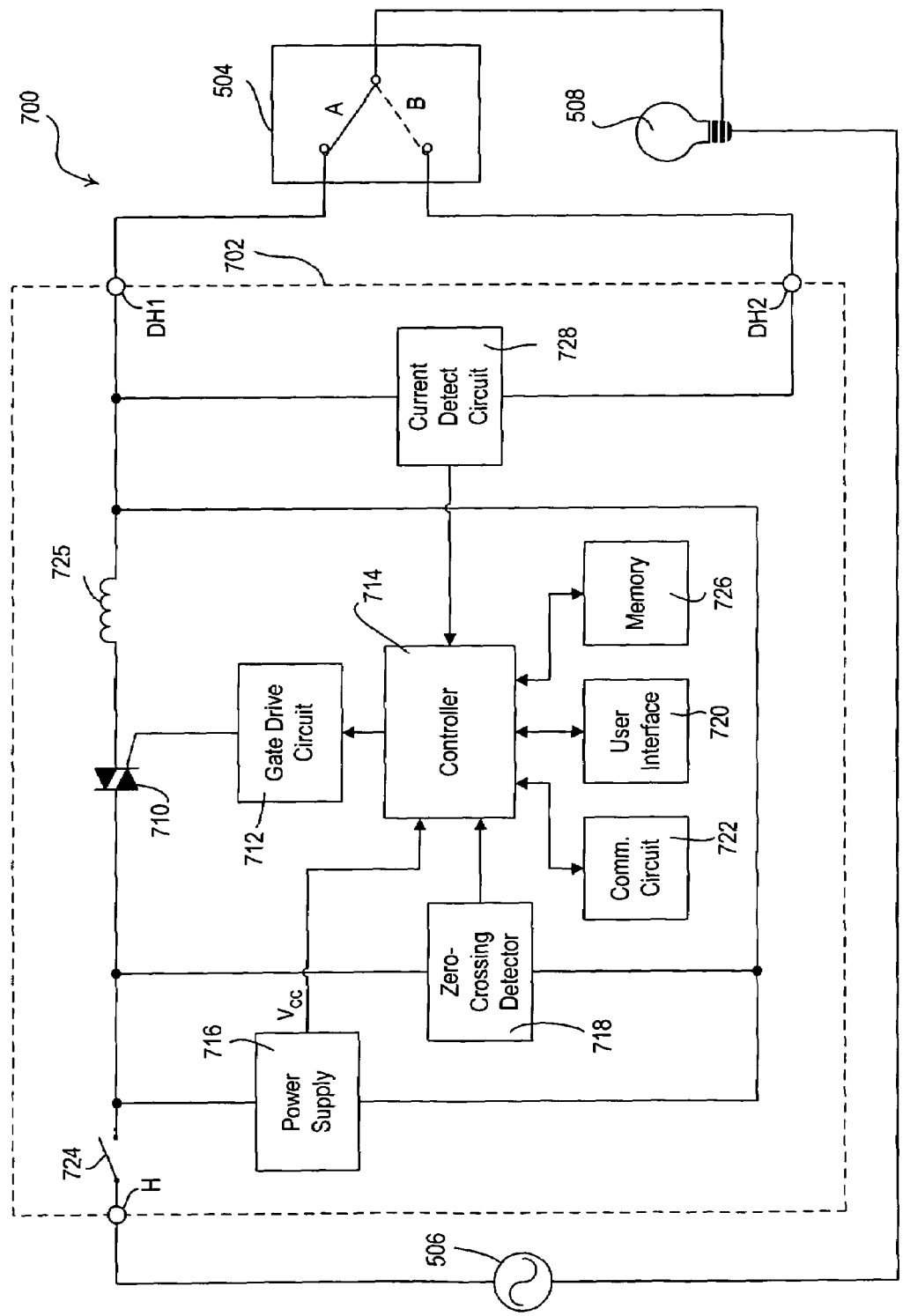
FIG. 7A is a simplified block diagram of a three-way lighting control system including a third embodiment of a smart three-way dimmer according to the present invention.

FIG. 7A shows a simplified block diagram of a three-way lighting control system 700 including a third embodiment of a smart three-way dimmer switch 702 according to the present invention. In this embodiment, the dimmer switch 702 includes a single controllably conductive device, for example, a bidirectional semiconductor switch, such as a triac 710. A controller 714 is coupled to the gate of the triac 710 through a gate drive circuit 712 and controls the conduction time of the triac each half-cycle. A power supply 716 is coupled across the triac 710 and generates a DC voltage VCC to power the controller 714. A zero-crossing detector 718 determines the zero-crossing points of the AC voltage source 506 and provides this information to the controller 714. A user interface 720 provides inputs to the controller 714 from a plurality of buttons (including a toggle button) and includes a plurality of LEDs for feedback to a user. A communication circuit 722 allows the controller 714 to transmit and receive messages with other control devices. An airgap switch 724 disconnects the dimmer switch 702 and the lighting load 508 from the AC voltage source 506. An inductor 725 is in series with the triac 710 and provides EMI filtering. A memory 726 stores the present state of the dimmer switch 702, such that the controller 714 can properly operate the triac 710 at power up.

The dimmer 702 also includes a current detect circuit (sensing circuit) 728 that is coupled between the first dimmed hot terminal DH1 and the second dimmed hot terminal DH2. The current detect circuit 728 is operable to detect when there is current flowing through the second dimmed hot terminal DH2 and to accordingly provide a control signal to the controller 714. The power supply 716 provides a current path through the current detect circuit 728 when the triac 710 is non-conducting. When the three-way switch 504 is in position B, the charging current through the power supply 716 will flow through the second dimmed hot terminal DH2. The current detect circuit 728 will sense the charging current and indicate to the controller 714 that the three-way switch is in position B. When the three-way switch 504 is in position A, no current will flow through the current detect circuit 728 and no signal will be provided to the controller 714. Thus, the controller 714 is able to determine the state of the three-way switch 504 and to control the state of the lighting load 508 (i.e., on or off) accordingly.

The memory 726 stores the state of the triac 710 and of the three-way switch 504. If the power supply 716 is unable to supply power to the controller 714 through the duration of a transition of the three-way switch 504, the controller 714 will reset, i.e., power down and then power up when the three-way switch 504 has finished the transition. At power up, the controller 714 of the dimmer 702 checks the status of the three-way switch 504 from the control signal of the current detect circuit 728 and compares the present state of the three-way switch to the state of the three-way switch that is stored in the memory 726. If the status of the three-way switch 504 has changed, the controller 714 will toggle the state of the triac 710 based on the present state of the triac that is stored in the memory 726.

Figure 7B:
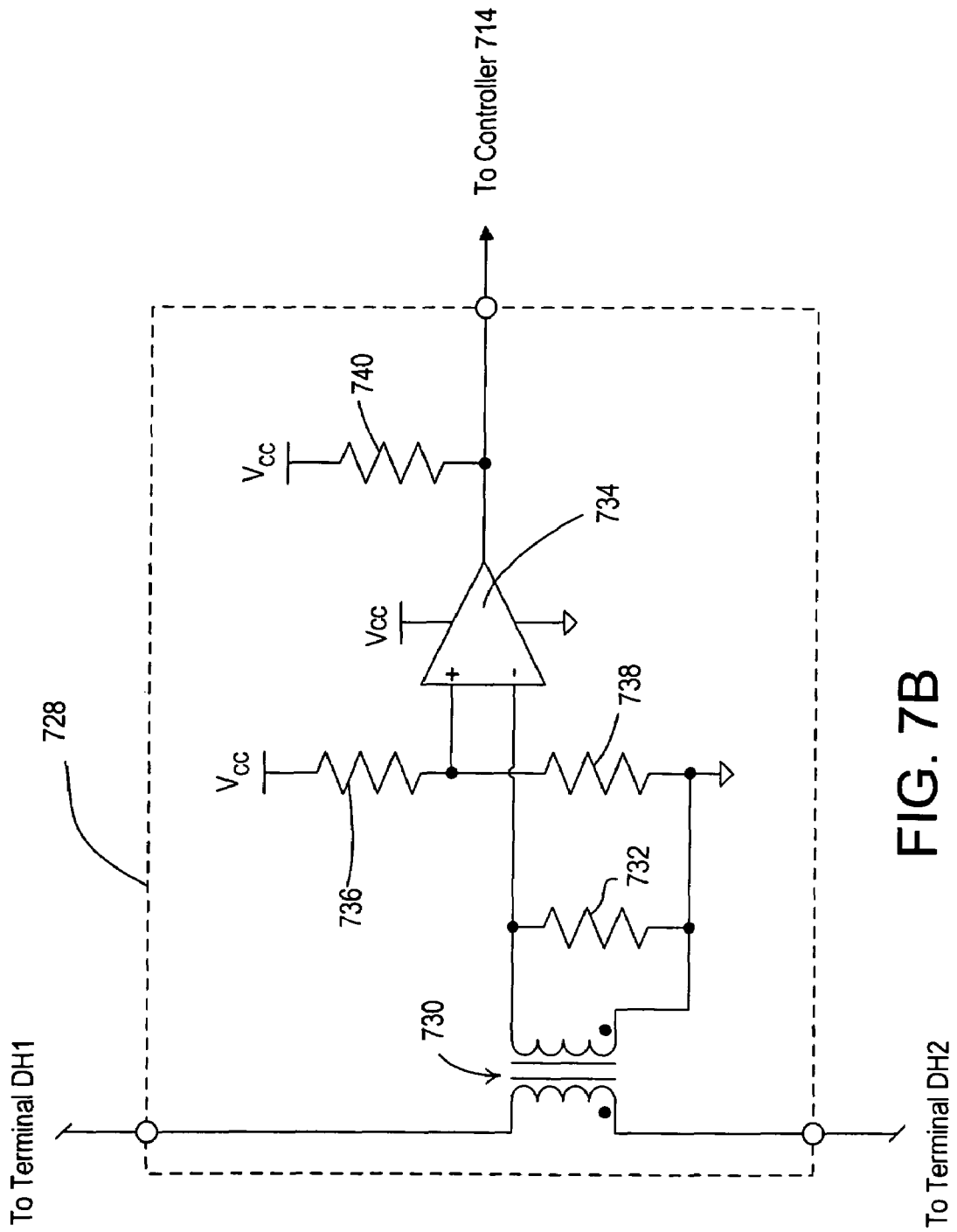
FIG. 7B shows a simplified schematic diagram of a current detect circuit of the dimmer of FIG. 7A.

FIG. 7B shows a simplified schematic diagram of the current detect circuit (sensing circuit) 728 of the dimmer 702. The current detect circuit 728 includes a current sense transformer 730 that has a primary winding coupled in series between the dimmed hot terminals DH1, DH2. The current sense transformer 730 only operates above a minimum operating frequency, for example, 100 kHz, such that current only flows in the secondary winding when the current waveform through the primary winding has a frequency above the minimum operating frequency. The current sense transformer 730 detects the falling edge of the current waveform through the power supply 716 when the charging current flows through the second dimmed hot terminal DH2. Since the dimmer 702 is using a triac as the semiconductor switch, the dimmer operates using forward phase control dimming, in which the triac 710 is non-conductive at the beginning of each half-cycle. Thus, the power supply 716 charges at the beginning of each half-cycle. When the power supply 716 stops charging during a half-cycle, the charging current through the power supply will drop to zero. Since the falling time of the current waveform through the primary winding of the current sense transformer 730 is very short (i.e., the waveform has a high-frequency component), a current will flow in the secondary of the current sense transformer when the switch 504 is in position B. An example of the current sense transformer 730 is part number CT319-200, manufactured by Datatronic, Ltd.

The secondary winding of the current sense transformer 730 is coupled across a resistor 732. The resistor 732 is further coupled between circuit common and the negative input of a comparator 734. A reference voltage is produced by a voltage divider comprising two resistors 736, 738 and is provided to the positive input of the comparator 734. The output of the comparator 734 is tied to $V_{CC}$ through a resistor 740 and is coupled to the controller 714. When current flows through the secondary winding of the current sense transformer 730, a voltage is produced across the resistor 732 that exceeds the reference voltage. The comparator 734 then drives the output low, signaling to the controller 714 that current has been sensed. Alternatively, the current detect circuit 728 may be implemented using an operational amplifier or a discrete circuit comprising one or more transistors rather than the comparator 734.

Figure 1C:
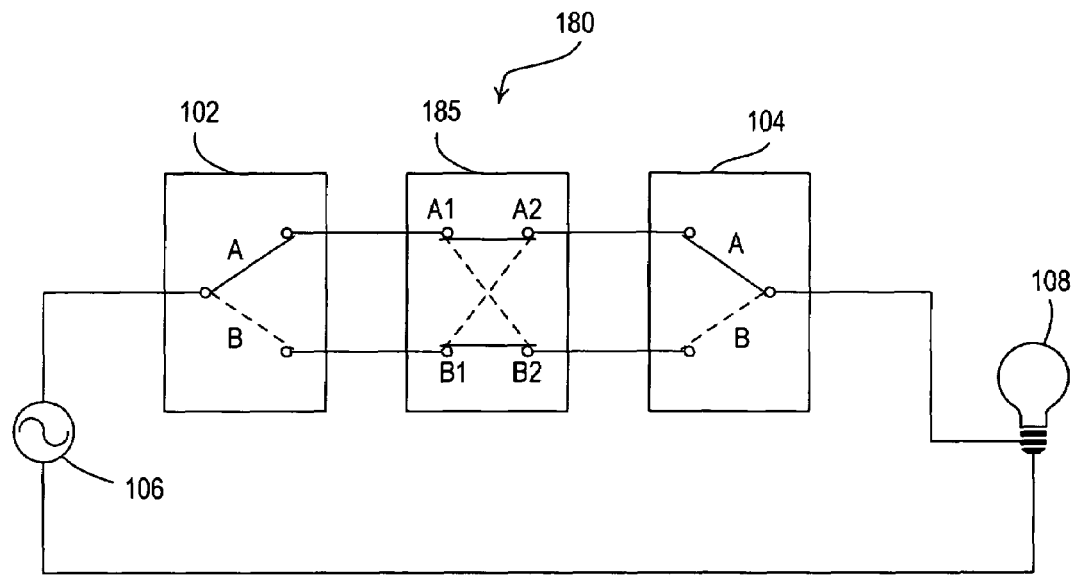
FIG. 1C shows a prior art four-way switching system.
Figure 1D:
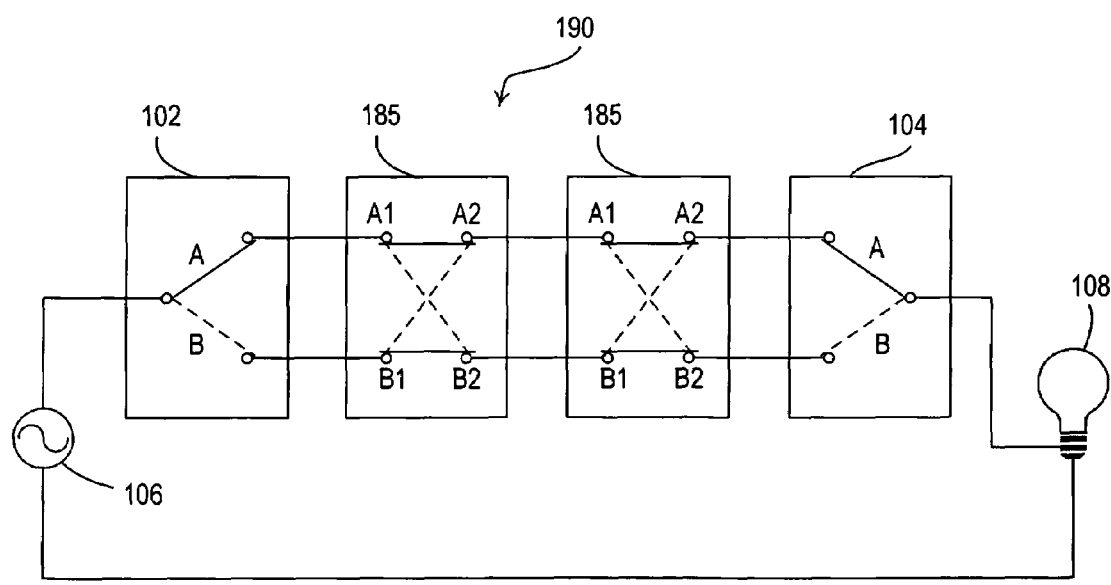
FIG. 1D shows a prior art extended four-way switching system.
Figure 2:
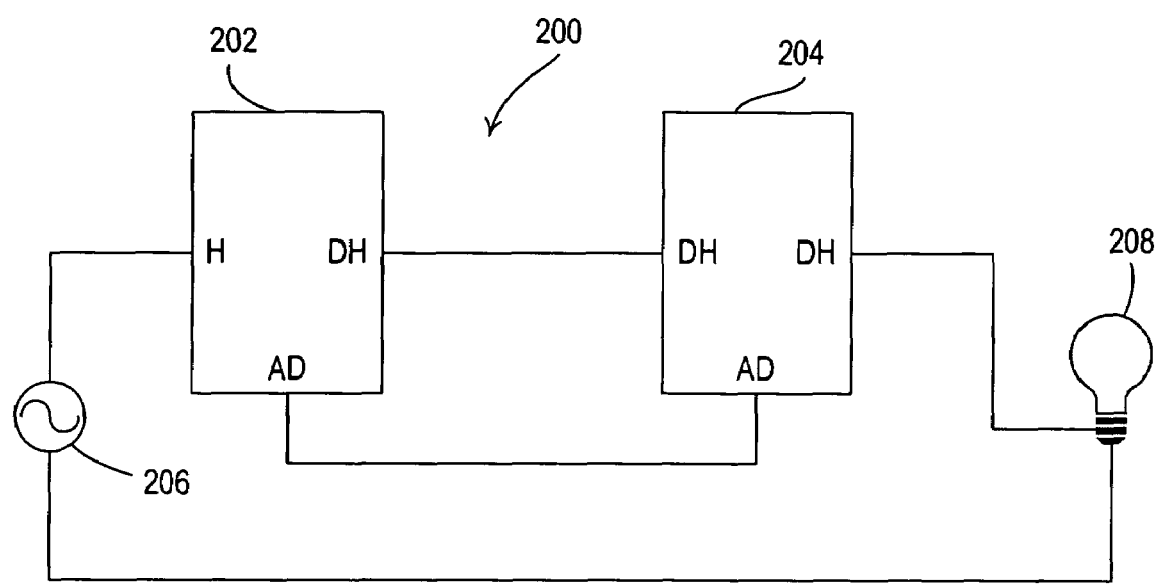
FIG. 2 is a simplified block diagram of a typical prior art multiple location lighting control system.
Figure 8:
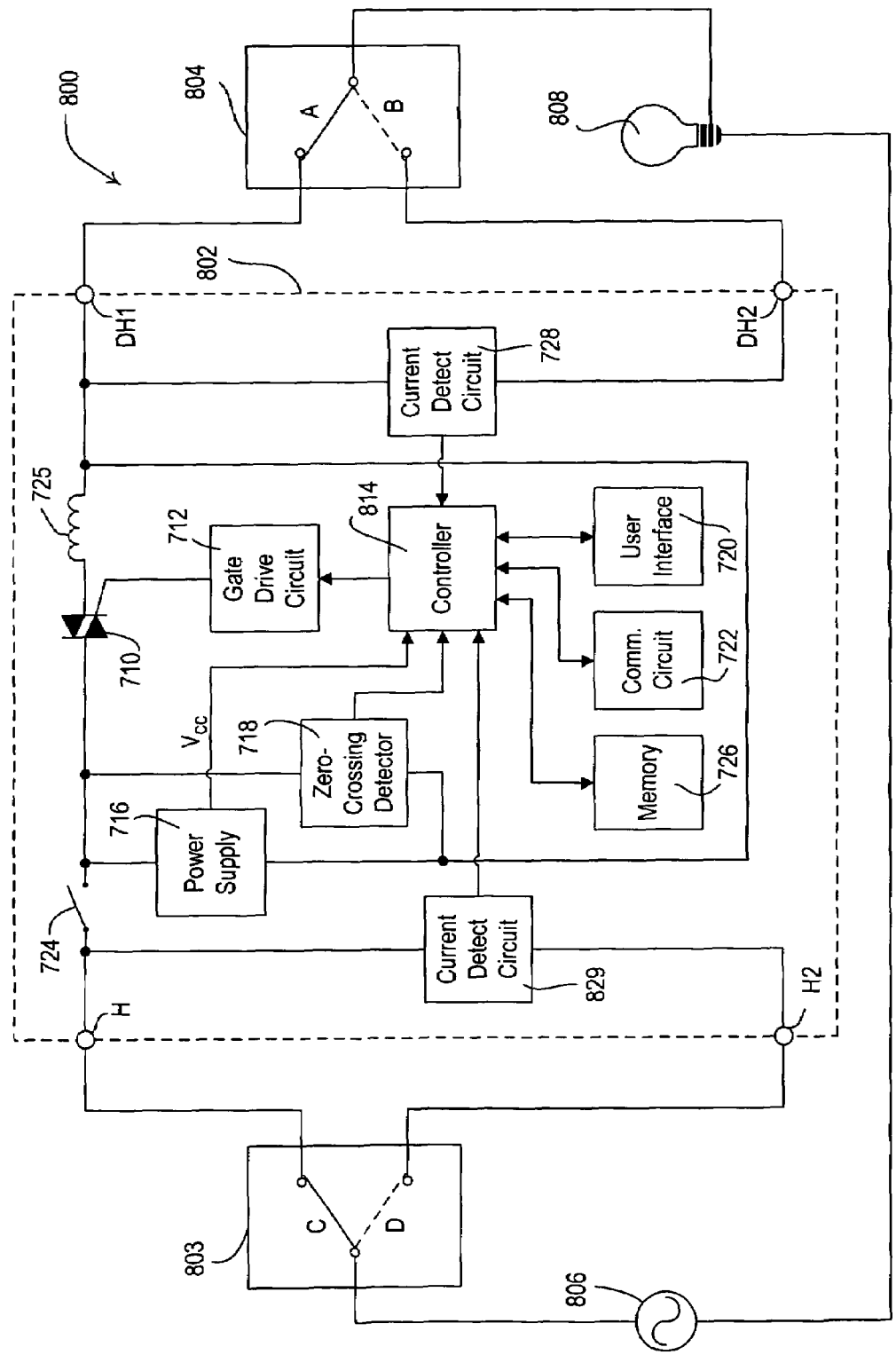
FIG. 8 is a simplified block diagram of a four-way lighting control system including a smart four-way dimmer according to the present invention.

FIG. 8 is a simplified block diagram of a four-way lighting control system 800 including a smart four-way dimmer switch 802 according to the present invention. The dimmer 802 and two three-way switches 803, 804 are coupled between an AC voltage source 806 and a lighting load 808. The dimmer 802 has replaced the four-way switch 185 in the four-way lighting control system 180 of FIG. 1C.

The dimmer 802 operates on the same principles as the dimmer 702 of FIG. 7A. However, the dimmer 802 includes an additional hot terminal H2 that is coupled to the three-way switch 803 on the line-side of the system 802. The dimmer 802 further comprises a second current detect circuit (sensing circuit) 829 that is coupled between the hot terminals H, H2 and provides a signal to a controller 814. The second current detect circuit 829 operates in the same manner as the first current detect circuit 728. When current is detected flowing through the second current detect circuit 829, the controller 814 determines that the line-side three-way switch 803 is in position D. When no current is flowing through the second current detect circuit 829, the three-way switch 803 is in position C. Thus, the controller 814 is able to determine the states of both the line-side three-way switch 803 and the load-side three-way switch 804 and to operate the triac 710 accordingly. When either three-way switch 803, 804 is toggled, or the toggle button of the user interface 720 is actuated, the controller 714 will toggle the state of the lighting load 808.

Even though the four-way dimmer switch 802 has four connections, the dimmer could be installed in a three-way system (in place of the three-way dimmer switch 502 in FIG. 5A or three-way dimmer switch 702 in FIG. 7A). One of the additional terminals DH2 or H2 would not be connected in the system 800. So, the dimmer 802 allows for a single device that can be installed in any location of a four-way or three-way system without the need to determine in advance what kind of switch the dimmer will be replacing.

Figure 9:
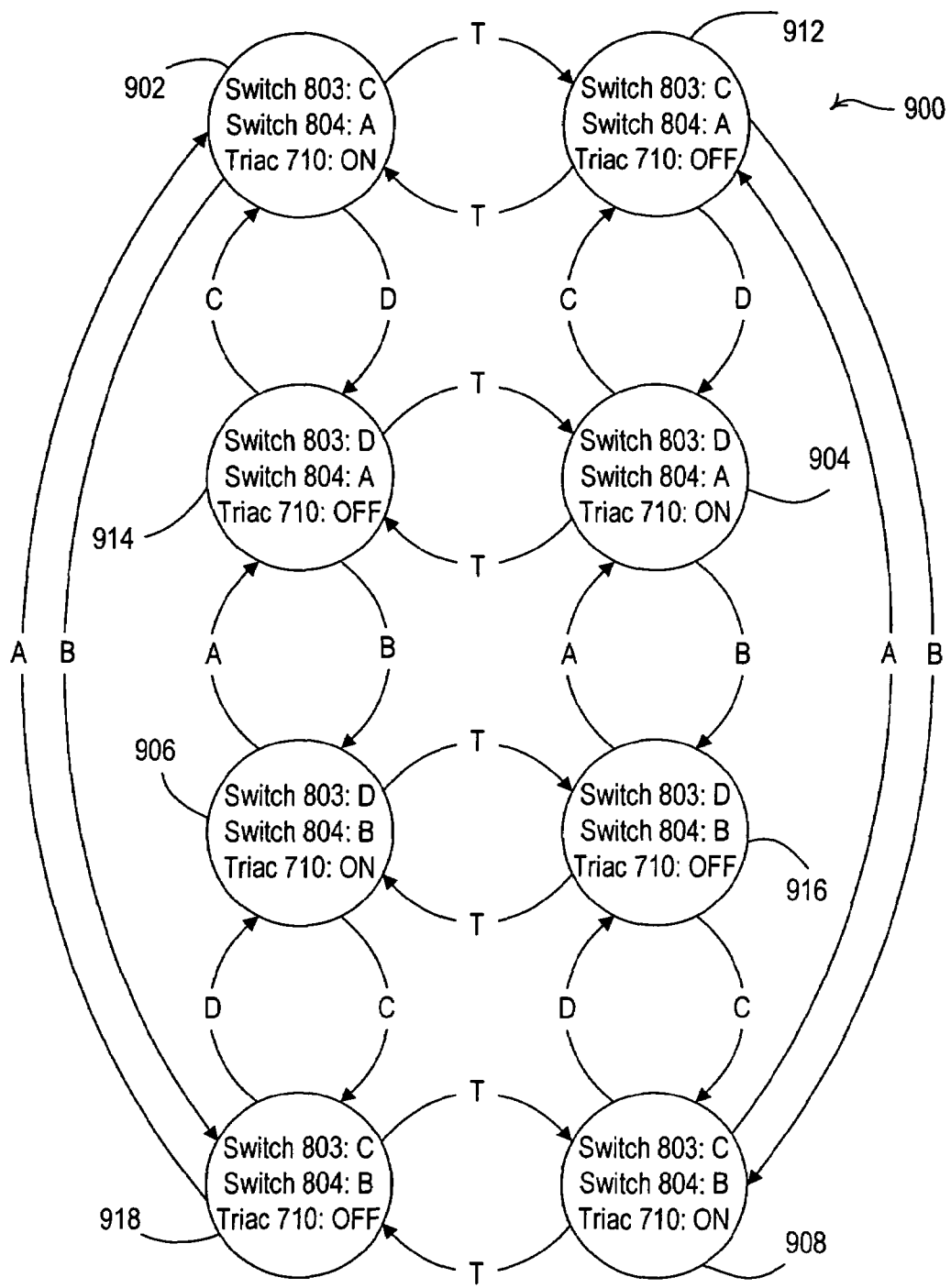
FIG. 9 shows a state diagram summarizing the operation of the lighting control system of FIG. 8.

FIG. 9 shows a state diagram 900 summarizing the operation of the lighting control system 800 of FIG. 8. In four states 902, 904, 906, 908, the triac 710 will be conducting since the desired state of the lighting load 808 is on. The state diagram 900 also shows four states 912, 914, 916, 918 in which the desired state of the lighting load 808 is off. A transition between states can be caused by one of five actions: a toggle of the three-way switch 804 from position A to position B (designated by 'B' in FIG. 6B), a toggle of the three-way switch 804 from position B to position A (designated by 'A'), a toggle of the three-way switch 803 from position C to position D (designated by 'D'), a toggle of the three-way switch 803 from position D to position C (designated by 'C'), and an actuation of the toggle switch of the user interface 720 (designated by 'T') (or when a "toggle" signal is received via the communication circuit 722). Note that in all states of the state diagram 900, the triac 710 is operable to conduct current to the lighting load 808 to control the state of the lighting load independent of the states of the three-way switches 803, 804.

The state diagram 900 thus identifies the status of the three-way switch 803, the three-way switch 804, and the triac 710 (and thus the lighting load 808) for all possible states and shows all the state transitions when the three-way switches 803, 804 are toggled and the toggle button of the user interface 720 is actuated (or when a "toggle" signal is received via the communication circuit 722).

FIG. 10 is a flowchart of a state control procedure 1000 of the controller 814 for determining the state of the dimmer 802. The state control procedure 1000 runs periodically, for example, approximately every 6 msec. The state control procedure 1000 includes a button routine 1100, a current detect routine 1200, and a triac state routine 1300. While the button routine 1100, the current detect routine 1200, and the triac state routine 1300 are shown executing in sequential order in FIG. 10, these routines alternatively could each be called from different pieces of software and each be executed at a different interval.

The controller 814 utilizes a FIFO (first in, first out) stack to store requests for the triac state routine 1300 to change the state of the triac 710. The button routine 1100 and the current detect routine 1200 are both operable to load an event (for example, a "toggle event") into the FIFO stack. The triac state routine loads these events from the FIFO stack and processes the events. In the discussion of FIGS. 10 through 14, only toggle events are discussed. However, other events, such as "increase intensity" or "decrease intensity", could be loaded into the FIFO stack by other routines (not described).

In the state control procedure 1000, the controller 814 utilizes three variables: TRIAC_STATUS, 1ST_DETECT, and 2ND_DETECT that are stored in the memory 726. The variable TRIAC_STATUS stores the conduction state of the triac 710, i.e., either ON or OFF. The variables 1ST_DETECT and 2ST_DETECT store the state of the first current detect circuit 728 and the second current detect circuit 829, respectively. The possible values for the variables 1ST_DETECT and 2ST_DETECT are TRUE (when current is detected) and FALSE (when current is not detected).

A flowchart describing the process of the button routine 1100 is shown in FIG. 11. At step 1110, the controller 814 first checks the toggle button of the user interface 720. If the toggle button is being pressed at step 1112, the controller 814 will load a "toggle event" into the FIFO stack at step 1114 and exit the process. If the toggle button is not being pressed at step 1112, the process simply exits.

Figure 12:
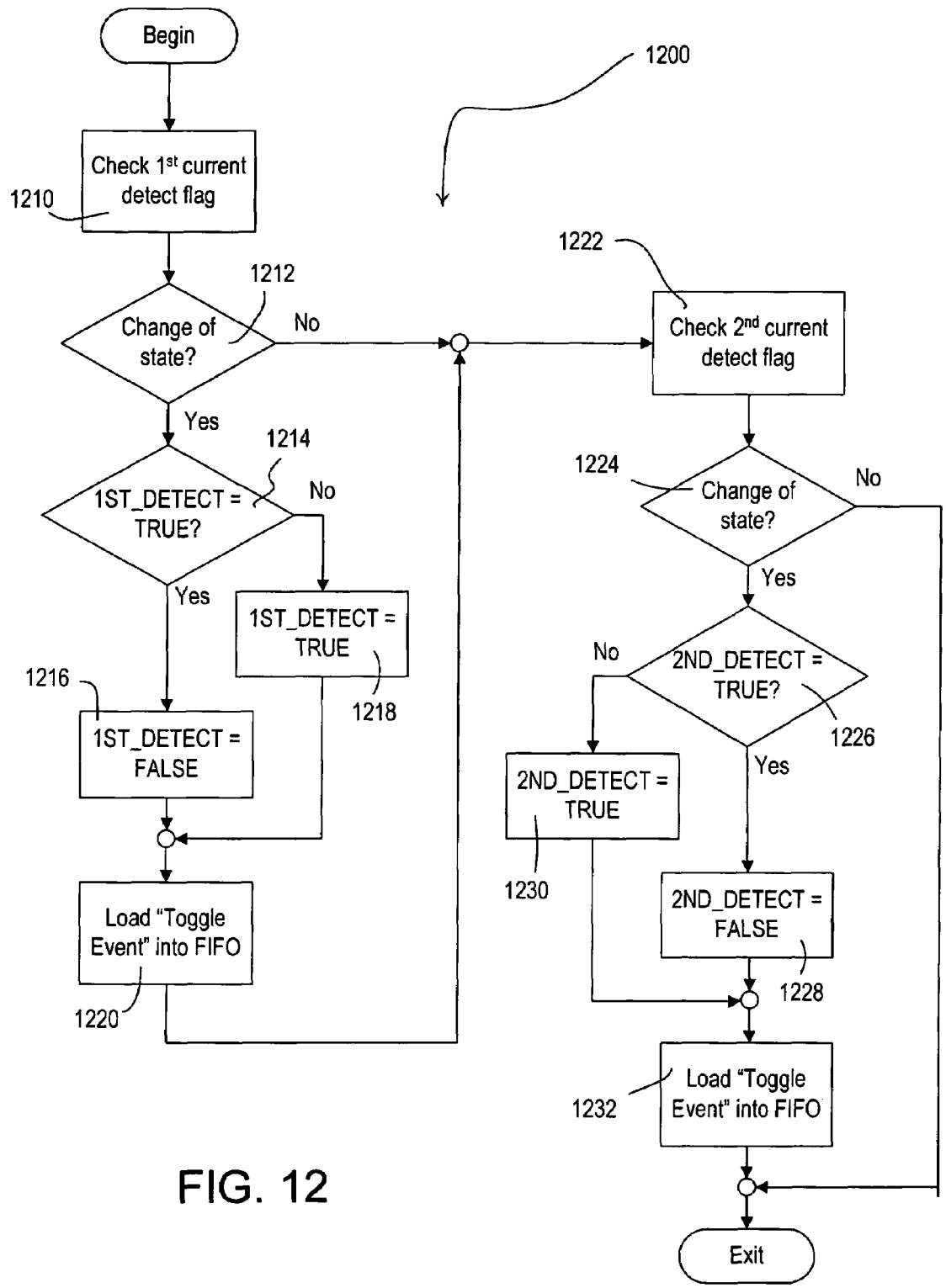
FIG. 12 is a flowchart of the process of the current detect routine of the control loop of FIG. 10.

FIG. 12 is a flowchart of the process of the current detect routine 1200. The outputs of the first current detect circuit 728 and second current detect circuit 829 are coupled to separate interrupt inputs on the controller 814. Whenever an input is provided from the first current detect circuit 728, a first interrupt routine is executed to set a first current detect flag. Similarly, whenever an input is provided from the first current detect circuit 728, a second interrupt routine is executed to set a second current detect flag.

Referring to FIG. 12, the first current detect flag is first checked at step 1210. At step 1212, if the first current detect flag has changed states, i.e., the new state of the first current detect circuit is not equal to the value stored in the variable 1ST_DETECT, the process moves to step 1214, where a determination is made as to whether the present value of the variable 1ST_DETECT is equal to TRUE. If so, the variable 1ST_DETECT is set to FALSE at step 1216; otherwise, the variable 1ST_DETECT is set to TRUE at step 1218. Next, the controller 814 will load a "toggle event" into the FIFO stack at step 1220.

After loading a toggle event into the FIFO stack at step 1220, or after detecting no change of state of the first current detect circuit 728 at step 1212, the output of the second current detect circuit 829 is checked at step 1222. At step 1224, if the output of the second current detect circuit 829 has changed states, i.e., the new state of the second current detect circuit is not equal to the value stored in the variable 2ND_DETECT, a determination is made as to whether the present value of the variable 2ND_DETECT is equal to TRUE at step 1226. If so, the variable 2ND_DETECT is set to FALSE at step 1228; otherwise, the variable 2ND_DETECT is set to TRUE at step 1230. Next, the controller 714 will load a toggle event into the FIFO stack at step 1232 and exit.

At step 1224, if the output of the second current detect circuit 829 has not changed states, then the process simply exits without loading a toggle event into the FIFO stack.

Figure 13:
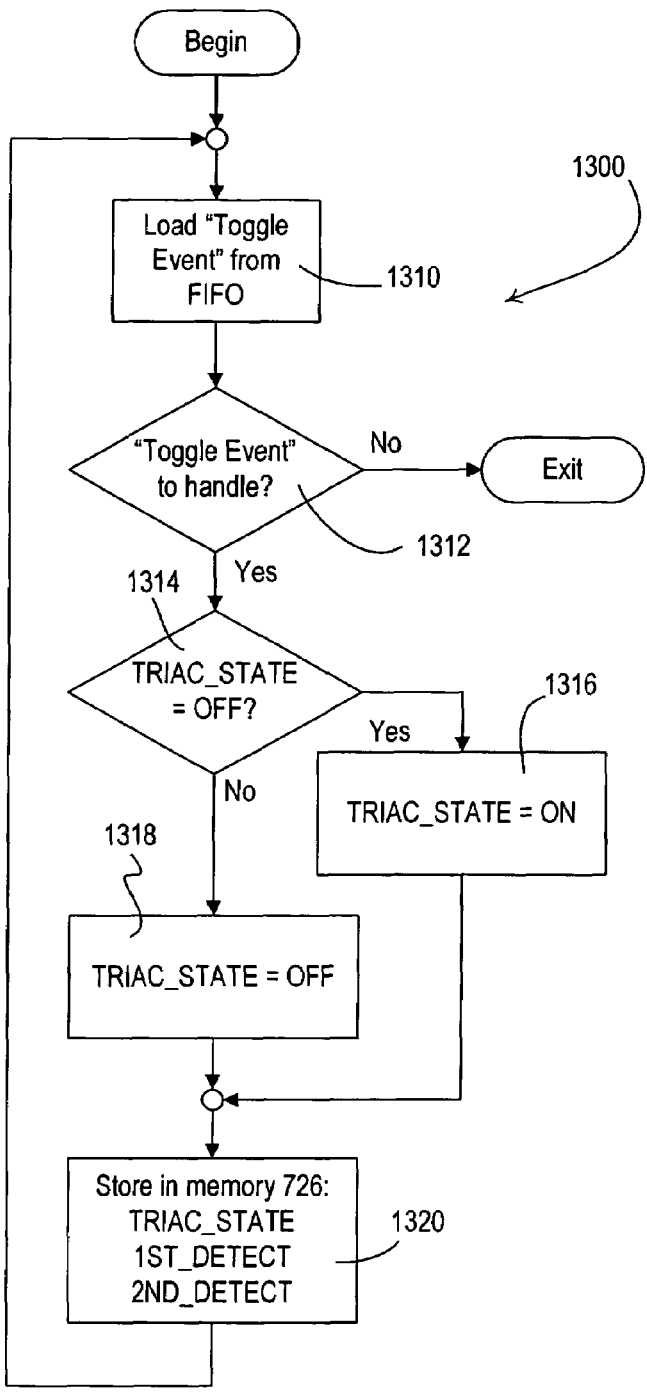
FIG. 13 is a flowchart of the process of the triac state routine of the control loop of FIG. 10.

FIG. 13 is a flowchart of the process of the triac state routine 1300. First, a toggle event is loaded from the FIFO stack (and deleted from the stack at the same time) at step 1310. If there is a toggle event in the FIFO stack to handle at step 1312, the triac state will be toggled. At step 1314, if the variable TRIAC_STATE is equal to OFF, then the variable TRIAC_STATE is set to ON at step 1316. Otherwise, the variable TRIAC_STATE is set to OFF at step 1318. At step 1320, the variables TRIAC_STATE, 1ST_DETECT, and 2ND_DETECT are stored in the memory 726. The process loops until there are no toggle events to handle at step 1312, at which time the process exits.

Figure 14:
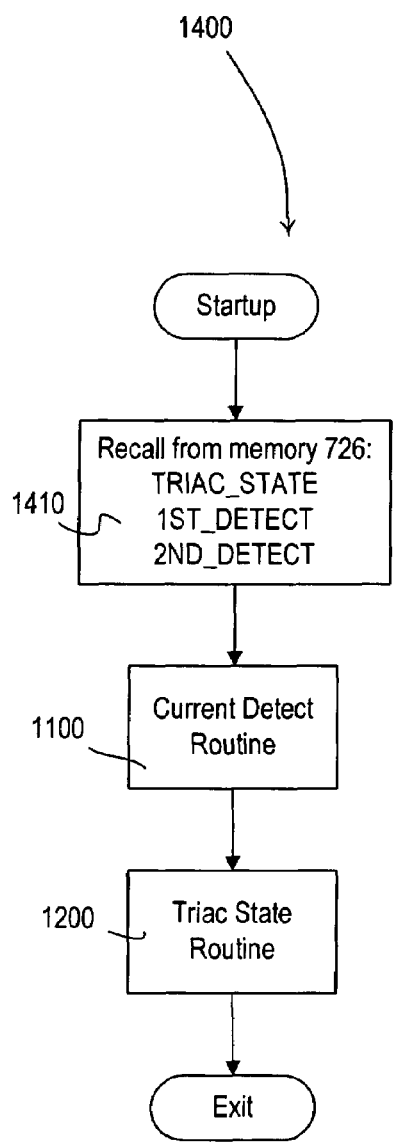
FIG. 14 is a flowchart of the startup process of the controller of the dimmer switch of FIG. 8.

FIG. 14 is a flowchart of the startup process 1400 that the controller 814 performs at power up, for example, if the controller 814 loses power while a connected three-way or four-way switch is transitioning. First, the controller 814 reads the variables TRIAC_STATE, 1ST_DETECT, and 2ND_DETECT from the memory 726 at step 1410. Next, the controller 814 checks the status of the first current detect circuit 728 and the second current detect circuit 829 in the current detect routine 1100. Next, the controller 814 determines whether to change the variable TRIAC_STATE in the triac state routine 1200. Finally, the process exits to begin normal operation executing the state control procedure 1000 of FIG. 10.

Although the embodiment of FIG. 8 shows two current detect circuits 728, 829. Additional sensing circuits could be employed. For example, a current detect circuit could be employed coupled in series with each terminal of the smart four-way dimmer switch 802 for a total of four current detect circuits.

The smart dimmers 502, 602, 702, and 802 are useful in three-way and four-way applications without the requirement of replacing the standard switches already installed in the other switching location(s). Unlike applications described above in the prior art, all other switches at other switching locations in the same three-way or four-way circuit do not have to be replaced with an accessory dimmer. Accordingly, the present invention has a reduced cost. Only one smart three-way or four-way dimmer need be purchased and the existing switches in the three-way or four-way switching circuit remain fully operational. By installing a single dimmer 502, 602, 702, or 802, less time is required for installation, thereby reducing installation costs. Also, there is less chance of errors in installation (e.g., mistakes in wiring), further reducing installation costs and the likelihood of damaging and replacing units.

Thus, dimmers 502, 602, 702, and 802 are configurable as three-way or four-way (or multi-way) switches that improve upon prior art smart dimmers. In accordance with the present invention, the dimmers are relatively inexpensive to manufacture, and are easier to install in existing electrical systems than prior art smart dimmers providing three-way and four-way switching functionality. For example, users are not required to replace other existing three-way switches with accessory dimmers. Moreover, modifications to wiring of the other existing three-way switches is avoided.

Furthermore, the various examples of three-way dimmers 502, 602, and 702 illustrated herein are each shown as connected directly to the line-side of the lighting control systems. One of ordinary skill in the art will recognize that, in the alternative, the dimmers 502, 602, and 702 could be wired on the load-side of the systems.

Figure 15:
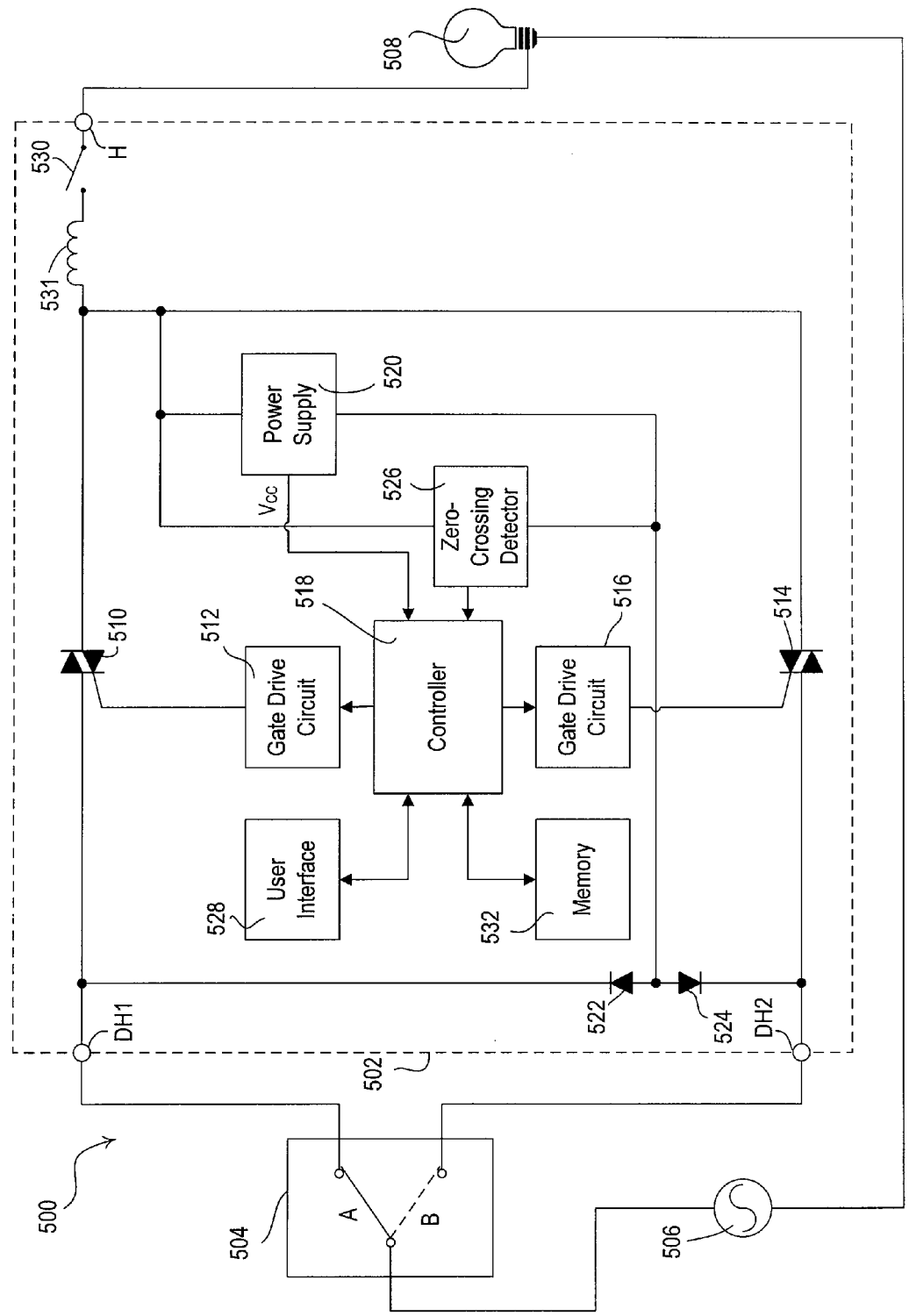
FIG. 15 shows an example of the three-way lighting control system 500 of FIG. 5A modified to show the electronic dimmer switch 502 on the load side and the three-way mechanical switch 504 on the line side.
Figure 16:
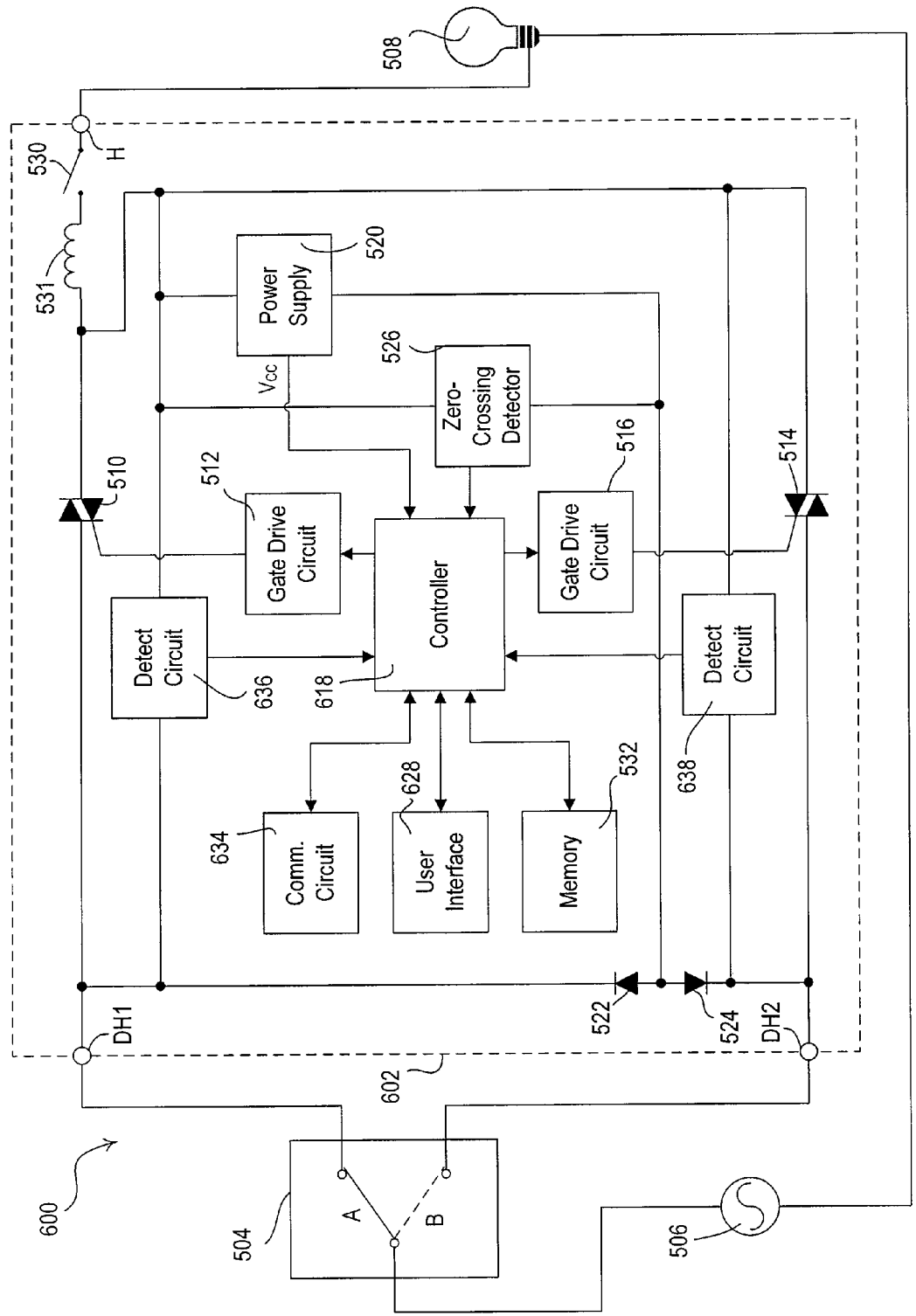
FIG. 16 shows an example of the three-way lighting control system 600 of FIG. 6A modified to show the electronic dimmer switch 602 on the load side and the three-way mechanical switch 604 on the line side.
Figure 17:
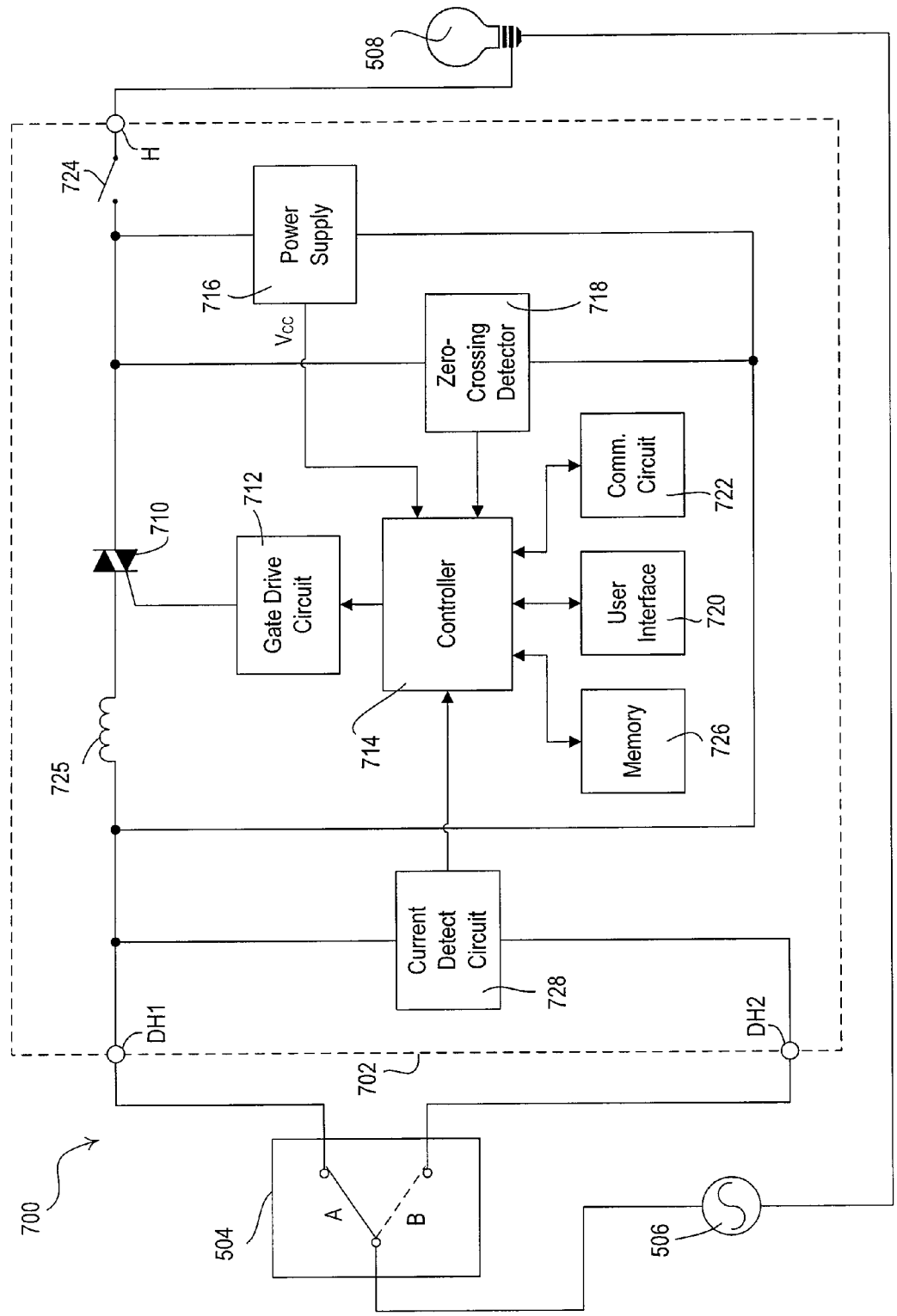
FIG. 17 shows an example of the three-way lighting control system 700 of FIG. 7A modified to show the electronic dimmer switch 702 on the load side and the three-way mechanical switch 704 on the line side.

FIGS. 15, 16, and 17 shows examples of the three-way lighting control systems 500, 600, 700 of FIGS. 5A, 6A, 7A, respectively, modified to show the electronic dimmer switches 502, 602, 702 on the load side and the three-way mechanical switches 504 on the line side.

Although the words "device" and "unit" have been used to describe the elements of the lighting control systems of the present invention, it should be noted that each "device" and "unit" described herein need not be fully contained in a single enclosure or structure. For example, the dimmer 502 of FIG. 5 may comprise a plurality of buttons in a wall-mounted enclosure and a controller that is included in a separate location. Also, one "device" may be contained in another "device". For example, the semiconductor switch (i.e., the controllably conductive device) is a part of the dimmer of the present invention.

Although the present invention has been described in relation to particular embodiments thereof, many other variations and modifications and other uses will become apparent to those skilled in the art. Therefore, the present invention should not be limited by the specific disclosure herein.

What is claimed is:

1. A dimmer switch adapted to be coupled to a circuit including an AC power source, a load, and a single-pole double-throw three-way switch, the three-way switch comprising a first fixed contact, a second fixed contact, and a movable contact adapted to be coupled to either the power source or the load, the three-way switch having a first state in which the movable contact is contacting the first fixed contact and a second state in which the movable contact is contacting the second fixed contact, the dimmer switch comprising:
   a first load terminal adapted to be coupled to either the power source or the load to which the three-way switch is not coupled;
   a second load terminal adapted to be coupled to the first fixed contact of the three-way switch;
   a third load terminal adapted to be coupled to the second fixed contact of the three-way switch;
   a controllably conductive device electrically coupled to the first, second, and third load terminals, the controllably conductive device having a conductive state in which the controllably conductive device is controlled so as to be operable to deliver a desired amount of power to the load and a non-conductive state in which the controllably conductive device is controlled so as to be operable to deliver substantially no power to the load, the controllably conductive device arranged such that when the controllably conductive device is in the conductive state and the dimmer switch is coupled to the circuit, the controllably conductive device is operable to allow a current to the load to flow between the first terminal and the second terminal or between the first terminal and the third terminal for at least a portion of each half-cycle of the AC power source;
   a sensing device electrically coupled to at least one of the second load terminal and the third load terminal, such that when the at least one of the second load terminal and the third load terminal is coupled to the three-way switch, the sensing device is operable to sense an electrical characteristic associated with the load terminal to which the sensing device is coupled;
   a controller operably coupled to the controllably conductive device and to the sensing device, the controller operable to control the controllably conductive device in response to an output of the sensing device in accordance with the electrical characteristic; and
   a power supply electrically coupled in shunt electrical connection with the controllably conductive device and operable to provide power to the controller.

2. The dimmer switch of claim 1, wherein the sensing device comprises a current sensing device.

3. The dimmer switch of claim 2, wherein the current sensing device comprises a current transformer.

4. The dimmer switch of claim 3, wherein the current transformer comprises a primary winding and a secondary winding, the primary winding of the current transformer being coupled between the controllably conductive device and at least one of the second and third load terminals, and the secondary winding of the current transformer being coupled so as to provide the output of the sensing device to the controller.

5. The dimmer switch of claim 4, wherein the current sensing device is operable to detect whether a charging current is flowing in the power supply.

6. The dimmer switch of claim 5, wherein the sensing circuit is operable to generate a control signal representative of whether the charging current is flowing in the power supply and the controller is operable to change the controllably conductive device between the conductive and non-conductive states in response to the control signal.

7. The dimmer switch of claim 1, wherein the controllably conductive device comprises a bidirectional semiconductor switch.

8. The dimmer switch of claim 7, wherein the bidirectional semiconductor switch comprises a triac.

9. The dimmer switch of claim 7, wherein the bidirectional semiconductor switch comprises two field-effect transistors in anti-series connection.

10. The dimmer switch of claim 1, further comprising:
    a communication circuit adapted to receive a message including control information;
    wherein the controller is operable to control the controllably conductive device in dependence on the control information.

11. The dimmer switch of claim 10, wherein the communication circuit receives the message via an IR communication link.

12. The dimmer switch of claim 10, wherein the communication circuit receives the message via an RF communication link.

13. The dimmer switch of claim 10, wherein the communication circuit receives the message via a wired communication link.

14. The dimmer switch of claim 1, further comprising:
    a communication circuit adapted to transmit a message including feedback information representative of the state of the controllably conductive device and the output of the sensing device.

15. The dimmer switch of claim 14, wherein the communication circuit transmits the message via an RF communication link.

16. The dimmer switch of claim 14, wherein the communication circuit transmits the message via a wired communication link.

17. The dimmer switch of claim 1, further comprising:
    a memory coupled to the controller.

18. The dimmer switch of claim 17, wherein the controller is operable to store in the memory state information representative of the state of the controllably conductive device and the output of the sensing device.

19. The dimmer switch of claim 18, wherein the controller is operable to recall the state information from the memory at power up.

20. The dimmer switch of claim 1, further comprising:
    a visual display for providing feedback to a user of the dimmer switch.

21. The dimmer switch of claim 20, wherein the visual display comprises a plurality of light-emitting diodes.

22. The dimmer switch of claim 1, wherein the controller comprises a microprocessor.

23. The dimmer switch of claim 1, further comprising:
    an actuator;
    wherein the controller controls the controllably conductive device in response to an actuation of the actuator.

24. The dimmer switch of claim 1, wherein the load comprises a lighting load and the controller is operable to control the conductive state of the controllably conductive device so as to control a dimming level of the lighting load.

25. The dimmer switch of claim 1, further comprising:
a fourth electrical load terminal; and
a second sensing device electrically coupled to at least one of the first load terminal and the fourth load terminal, the sensing device operable to sense a second electrical characteristic associated with the load terminal to which the second sensing device is coupled;
wherein the controller is coupled to the second sensing device and is operable to control the controllably conductive device in response to an output of the second sensing device in accordance with the second electrical characteristic; and
wherein the controllably conductive device is arranged such that when the controllably conductive device is in the conductive state and the dimmer switch is coupled to the circuit, current to the load flows between the first load terminal and one of the second load terminal and the third load terminal, or between the fourth load terminal and one of the second load terminal and the third load terminal, depending on the output of the second sensing device.

26. A dimmer switch adapted to be coupled to a circuit including an AC power source having a hot connection and a neutral connection, a load, and a single-pole double-throw three-way switch, the three-way switch comprising a first fixed contact, a second fixed contact, and a movable contact adapted to be coupled to either the power source or the load, the three-way switch having a first state in which the movable contact is contacting the first fixed contact and a second state in which the movable contact is contacting the second fixed contact, the dimmer switch comprising:
a first load terminal adapted to be coupled to either the power source or the load to which the three-way switch is not coupled;
a second load terminal adapted to be coupled to the first fixed contact of the three-way switch;
a third load terminal adapted to be coupled to the second fixed contact of the three-way switch;
a controllably conductive device electrically coupled to the first, second, and third load terminals, the controllably conductive device having a conductive state in which the controllably conductive device is controlled so as to be operable to deliver a desired amount of power to the load and a non-conductive state in which the controllably conductive device is controlled so as to be operable to deliver substantially no power to the load, the controllably conductive device arranged such that when the controllably conductive device is in the conductive state and the dimmer switch is coupled to the circuit, the controllably conductive device is operable to allow a current to the load to flow between the first load terminal and the second load terminal or between the first load terminal and the third load terminal for at least a portion of each half-cycle of the AC power source;
a sensing device electrically coupled to at least one of the second load terminal and the third load terminal, such that when the at least one of the second load terminal and the third load terminal is coupled to the three-way switch, the sensing device is operable to sense electrical continuity between the hot connection and the neutral connection of the power source through the controllably conductive device and the load;
a controller operably coupled to the controllably conductive device and to the sensing device, the controller operable to control the controllably conductive device in response to an output of the sensing device; and
a power supply electrically coupled in shunt electrical connection with the controllably conductive device and operable to provide power to the controller.

27. A method for controlling a load in a circuit comprising an AC power source, the load, a dimmer switch, and a single-pole double-throw three-way switch, the three-way switch comprising a first fixed contact, a second fixed contact, and a movable contact adapted to be coupled to either the power source or the load, the three-way switch having a first state in which the movable contact is contacting the first fixed contact and a second state in which the movable contact is contacting the second fixed contact, the method comprising the steps of:
providing a first load terminal on the dimmer switch, the first load terminal adapted to be coupled to either the power source or the load to which the three-way switch is not coupled;
providing a second load terminal on the dimmer switch, the second load terminal adapted to be coupled to the first fixed contact of the three-way switch;
providing a third load terminal on the dimmer switch, the third load terminal adapted to be coupled to the second fixed contact of the three-way switch;
electrically coupling a controllably conductive device to the first, second, and third load terminals, the controllably conductive device having a conductive state in which the controllably conductive device is controlled so as to be operable to deliver a desired amount of power to the load and a non-conductive state in which the controllably conductive device is controlled so as to be operable to deliver substantially no power to the load;
sensing an electrical characteristic associated with at least one of the second load terminal and the third load terminal when the at least one of the second load terminal and the third load terminal is coupled to the three-way switch; and
controlling the controllably conductive device in accordance with the sensed electrical characteristic, such that the controllably conductive device is operable to allow a current through the load to flow between the first load terminal and the second load terminal, or between the first load terminal and the third load terminal for at least a portion of each half-cycle of the AC power source.

28. The method of claim 27, wherein the step of sensing comprises sensing a current through one of the second load terminal and the third load terminal.

29. The method of claim 28, further comprising the step of:
coupling a current transformer in series electrical connection with at least one of the second load terminal and the third load terminal.

30. The method of claim 29, further comprising the step of:
coupling a power supply in shunt electrical connection with the controllably conductive device;
wherein the step of sensing further comprises detecting whether a charging current of the power supply is flowing through the current transformer.

31. The method of claim 30, further comprising the step of:
generating a control signal representative of whether the charging current is flowing through the current transformer;
wherein the step of controlling the controllably conductive device comprises changing the controllably conductive device between the conductive state and the non-conductive state in response to the control signal.

32. The method of claim 27, wherein the controllably conductive device comprises a bidirectional semiconductor switch.

33. The method of claim 32, wherein the bidirectional semiconductor switch comprises a triac.

34. The method of claim 32, wherein the bidirectional semiconductor switch comprises two field-effect transistors in anti-series connection.

35. The method of claim 27, further comprising the step of:
receiving a message including control information;
wherein the step of controlling the controllably conductive device comprises controlling the controllably conductive device in response to the control information.

36. The method of claim 35, wherein the step of receiving the message comprises receiving the message via an IR communication link.

37. The method of claim 35, wherein the step of receiving the message comprises receiving the message via an RF communication link.

38. The method of claim 35, wherein the step of receiving the message comprises receiving the message via a wired communication link.

39. The method of claim 27, further comprising the step of:
transmitting a message including feedback information representative of the state of the controllably conductive device and a result of the step of sensing.

40. The method of claim 39, wherein the step of transmitting the message comprises transmitting the message via an RF communication link.

41. The method of claim 39, wherein the step of transmitting the message comprises transmitting the message via a wired communication link.

42. The method of claim 27, further comprising the step of:
storing in a memory state information representative of the state of the controllably conductive device and the sensed electrical characteristic.

43. The method of claim 42, further comprising the step of:
recalling the state information from the memory at power up.

44. The method of claim 27, further comprising the step of:
providing feedback to a user of the dimmer switch via a visual display.

45. The method of claim 44, wherein the visual display comprises a plurality of light-emitting diodes.

46. The method of claim 27, wherein the step of controlling the controllably conductive device further comprises controlling the controllably conductive device in response to an actuation of an actuator of the dimmer switch.

47. The method of claim 27, wherein the load comprises a lighting load and the step of controlling the controllably conductive device further comprises controlling the conductive state of the controllably conductive device so as to control a dimming level of the load.

48. The method of claim 27, further comprising the steps of:
providing a fourth electrical load terminal on the dimmer switch; and
sensing a second electrical characteristic associated with at least one of the first load terminal and the fourth load terminal;
wherein the step of controlling the controllably conductive device further comprises controlling the controllably conductive device in accordance with the sensed second electrical characteristic.

49. A system for supplying power to a load from an AC power source comprising:
a single-pole double-throw (SPDT) three-way switch comprising a first fixed contact, a second fixed contact, and a movable contact adapted to be coupled to either the power source or the load, the SPDT three-way switch having a first state in which the movable contact is contacting the first fixed contact and a second state in which the movable contact is contacting the second fixed contact; and
a dimmer switch comprising:
a first load terminal adapted to be coupled to either the power source or the load to which the SPDT three-way switch is not coupled to;
a second load terminal coupled to the first fixed contact of the SPDT three-way switch;
a third load terminal coupled to the second fixed contact of the SPDT three-way switch;
a first controllably conductive device electrically coupled such that when the first controllably conductive device is in a conductive state, a desired amount of power is capable of being delivered to the load, and when the first controllably conductive device is in a non-conductive state, substantially no power is capable of being delivered to the load;
a controller electrically coupled to the first controllably conductive device and operable to control the first controllably conductive device; and
a power supply electrically coupled in shunt electrical connection with the first controllably conductive device and operable to provide power to the controller;
wherein when the SPDT three-way switch is in the first state, the controller is operable to control the first controllably conductive device such that the first controllably conductive device is operable to allow a current to the load to flow through the second load terminal for at least a portion of each half-cycle of the AC power source when the first controllably conductive device is in the conductive state; and
wherein when the SPDT three-way switch is in the second state, the controller is operable to control the first controllably conductive device such that the first controllably conductive device is operable to allow the current to the load to flow through the third load terminal for at least a portion of each half-cycle of the AC power source when the first controllably conductive device is in the conductive state.

50. The system of claim 49, wherein the first controllably conductive device is electrically coupled between the first load terminal and the second load terminal such that when the first controllably conductive device is in the conductive state, a current to the load flows between the first load terminal and the second load terminal;
wherein the dimmer switch further comprises a second controllably conductive device having a conductive state in which the second controllably conductive device is controlled such that a desired amount of power is capable of being delivered to the load and a non-conductive state in which the second controllably conductive device is controlled such that substantially no power is capable of being delivered to the load, the second controllably conductive device electrically coupled between the first load terminal and the third load terminal such that when the second controllably conductive device is in the conductive state, current to the load flows between the first load terminal and the third load terminal.

51. The system of claim 50, wherein the dimmer switch further comprises:

a first sensing device electrically coupled to the second load terminal and operable to sense a first electrical characteristic associated with the second load terminal; and a second sensing device electrically coupled to the third load terminal and operable to sense a second electrical characteristic associated with the third load terminal;

wherein the controller is operable to control the first controllably conductive device in response to an output of the first sensing device in accordance with the first electrical characteristic and in response to an output of the second sensing device in accordance with the second electrical characteristic.

52. The system of claim 51, wherein the controller is operable to determine whether the SPDT three-way switch is in the first state or the second state in response to the outputs of the first and second sensing devices.

53. The system of claim 52, wherein the dimmer switch further comprises a memory coupled to the controller.

54. The system of claim 53, wherein the controller is operable to store in the memory state information representative of the states of the first and second controllably conductive devices and the state of the SPDT three-way switch.

55. The system of claim 54, wherein the controller is operable to recall the state information from the memory at power up.

56. The system of claim 52, wherein the dimmer switch further comprises a communication circuit adapted to transmit a message including feedback information representative of the states of the first and second controllably conductive devices and the state of the SPDT three-way switch.

57. The system of claim 52, wherein the load comprises a lighting load and the dimmer switch further comprises a visual display for providing to a user of the dimmer switch feedback information representative of a dimming level of the lighting load, the feedback information dependent on the states of the first and second controllably conductive devices and the state of the SPDT three-way switch.

58. The system of claim 51, wherein the controller is operable to control both the first and second controllably conductive devices to be non-conductive when the load is not powered.

59. The system of claim 50, wherein the first and second controllably conductive devices comprise bidirectional semiconductor switches.

60. The system of claim 50, wherein the dimmer switch further comprises a communication circuit adapted to receive a message including control information; and wherein the controller is operable to control the first and second controllably conductive devices dependent on the control information.

61. The system of claim 50, wherein the controller is operable to control the first and second controllably conductive devices to be conductive in a complementary basis, such that when the first controllably conductive device is conductive, the second controllably conductive device is non-conductive, and when the second controllably conductive device is conductive, the first controllably conductive device is non-conductive.

62. The system of claim 49, wherein the dimmer switch further comprises a sensing device electrically coupled to at least one of the second load terminal and the third load terminal, the sensing device operable to sense an electrical characteristic associated with the load terminal to which the sensing device is coupled;

wherein the first controllably conductive device is arranged such that when the first controllably conductive device is in the conductive state, a current to the load flows between the first load terminal and the second load terminal, or between the first load terminal and the third load terminal.

63. The system of claim 62, wherein the controller is operable to determine whether the SPDT three-way switch is in the first state or the second state in response to the output of the sensing device.

64. The system of claim 63, wherein the sensing device comprises a current sensing device.

65. The system of claim 64, wherein the current sensing device comprises a current transformer.

66. The system of claim 63, wherein the dimmer switch further comprises a memory coupled to the controller.

67. The system of claim 66, wherein the controller is operable to store in the memory state information representative of the state of the first controllably conductive device and the state of the SPDT three-way switch.

68. The system of claim 67, wherein the controller is operable to recall the state information from the memory at power up.

69. The system of claim 63, wherein the dimmer switch further comprises a communication circuit adapted to transmit a message including feedback information representative of the state of the first controllably conductive device and the state of the SPDT three-way switch.

70. The system of claim 63, wherein the load comprises a lighting load and the dimmer switch further comprises a visual display for providing to a user of the dimmer switch feedback information representative of a dimming level of the lighting load, the feedback information dependent on the state of the first controllably conductive device and the state of the SPDT three-way switch.

71. The system of claim 62, wherein the first controllably conductive device comprises a bidirectional semiconductor switch.

72. The system of claim 62, wherein the dimmer switch further comprises a communication circuit adapted to receive a message including control information; and wherein the controller is operable to control the first controllably conductive device dependent on the control information.

73. The system of claim 49, wherein the controller comprises a microprocessor.

74. The system of claim 49, wherein the dimmer switch further comprises an actuator;

wherein an actuation of the actuator causes the controller to control the first controllably conductive device.

75. The system of claim 49, wherein the load comprises a lighting load and the controller is operable to control the conductive state of the first controllably conductive device so as to control a dimming level of the lighting load.

76. The system of claim 49, wherein the first load terminal of the dimmer switch is coupled to the power source and the movable contact of the SPDT three-way switch is coupled to the load.

77. The system of claim 49, wherein the first load terminal of the dimmer switch is coupled to the load and the movable contact of the SPDT three-way switch is coupled to the power source.

* * * * *